(12) United States Patent
Miyamoto et al.

(10) Patent No.: US 9,341,200 B2
(45) Date of Patent: May 17, 2016

(54) WORK VEHICLE AND CONTROL METHOD FOR SAME

(71) Applicant: KOMATSU LTD., Tokyo (JP)

(72) Inventors: Shunsuke Miyamoto, Atsugi (JP);
Kenichi Yamada, Fujisawa (JP);
Yasunori Ohkura, Kawasaki (JP);
Yasuki Kishimoto, Fujisawa (JP);
Masao Yoshizawa, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/759,039

(22) PCT Filed: Sep. 3, 2014

(86) PCT No.: PCT/JP2014/073187
§ 371 (c)(1),
(2) Date: Jul. 2, 2015

(87) PCT Pub. No.: WO2015/056492
PCT Pub. Date: Apr. 23, 2015

(65) Prior Publication Data
US 2015/0337877 A1 Nov. 26, 2015

(30) Foreign Application Priority Data

Oct. 18, 2013 (JP) ................................. 2013-217412

(51) Int. Cl.
*F15B 1/02* (2006.01)
*F15B 21/00* (2006.01)
(Continued)

(52) U.S. Cl.
CPC .............. *F15B 21/001* (2013.01); *B60K 6/445* (2013.01); *B60L 11/14* (2013.01); *B60L 11/18* (2013.01);
(Continued)

(58) Field of Classification Search
CPC ..... B60W 10/08; B60W 10/26; F15B 21/001; F16H 3/66; F16H 3/72
See application file for complete search history.

(56) References Cited

U.S. PATENT DOCUMENTS 8,858,392 B2 * 10/2014 Dix ........................ F16H 61/438
477/68
2015/0158492 A1 * 6/2015 Bulgrien ............... B60W 10/02
701/53

(Continued)

FOREIGN PATENT DOCUMENTS

JP 2001-339805 A 12/2001
JP 2006-329244 A 12/2006
(Continued)

OTHER PUBLICATIONS

The International Search Report for the corresponding international application No. PCT/JP2014/073187 issued on Dec. 2, 2014.

*Primary Examiner* — Derek D Knight
(74) *Attorney, Agent, or Firm* — Global IP Counselors, LLP

(57) ABSTRACT

The target input shaft torque determination unit determines a target input shaft torque. The target output shaft torque determination unit determines a target output shaft torque so that a deceleration force for decelerating the vehicle is generated on the output shaft of the power transmission device in a state in which connection and disconnection states of the forward travel clutch and the reverse travel clutch are maintained at the state before the start of the shuttle action when the shuttle action is started. The torque-balance information is stored in a storage unit and defines a relationship between the target input shaft torque and the target output shaft torque to achieve a balance of the torques of a power transmission device. The command torque determination unit uses the torque-balance information to determine torque commands for the motor from the target input shaft torque and the target output shaft torque.

11 Claims, 11 Drawing Sheets

(51) Int. Cl.
  *B60K 6/445* (2007.10)
  *B60L 11/14* (2006.01)
  *B60L 11/18* (2006.01)
  *B60W 10/08* (2006.01)
  *B60W 10/10* (2012.01)
  *B60W 10/26* (2006.01)
  *B60W 20/00* (2016.01)
  *F16H 3/66* (2006.01)
  *F16H 3/72* (2006.01)
  *F16H 37/10* (2006.01)

(52) U.S. Cl.
  CPC ............... *B60W 10/08* (2013.01); *B60W 10/10* (2013.01); *B60W 10/26* (2013.01); *B60W 20/00* (2013.01); *F15B 1/02* (2013.01); *F16H 3/66* (2013.01); *F16H 3/72* (2013.01); *F16H 3/728* (2013.01); *F15B 2201/00* (2013.01); *F16H 2037/101* (2013.01); *F16H 2200/2007* (2013.01); *F16H 2200/2041* (2013.01)

(56) References Cited

U.S. PATENT DOCUMENTS

2015/0315767 A1* 11/2015 Miyamoto ............. E02F 3/283
  701/50
2015/0361636 A1* 12/2015 Yoshizawa ............ B60K 6/445
  701/50

FOREIGN PATENT DOCUMENTS

| | | |
|---|---|---|
| JP | 2007-298050 A | 11/2007 |
| JP | 2009-51366 A | 3/2009 |
| JP | 2009-202710 A | 9/2009 |
| JP | 2010-247749 A | 11/2010 |
| WO | 2006/126368 A1 | 11/2006 |

* cited by examiner

| Accelerator operating amount (%) | Brake operating amount (%) | | | | | | | | | | |
|---|---|---|---|---|---|---|---|---|---|---|---|
| | 0 | 10 | 20 | 30 | 40 | 50 | 60 | 70 | 80 | 90 | 100 |
| 0 | r1 | r1 | r2 | r3 | r4 | r5 | r6 | r7 | r8 | r9 | r10 |
| 5 | r1 | r1 | r2 | r3 | r4 | r5 | r6 | r7 | r8 | r9 | r10 |
| 50 | r2 | r2 | r3 | r4 | r5 | r6 | r7 | r8 | r9 | r9 | r10 |
| 95 | r10 | r10 | r10 | r10 | r10 | r10 | r10 | r10 | r10 | r10 | r10 |
| 100 | r10 | r10 | r10 | r10 | r10 | r10 | r10 | r10 | r10 | r10 | r10 |

| Speed range | 1st | 2nd | 3rd | 4th |
|---|---|---|---|---|
| Maximum output shaft torque | T1 | T2 | T3 | T4 |

FIG. 12A  Tractive force (deceleration force)
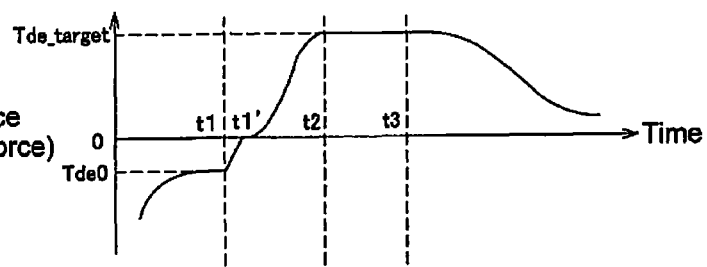
FIG. 12B  Vehicle speed
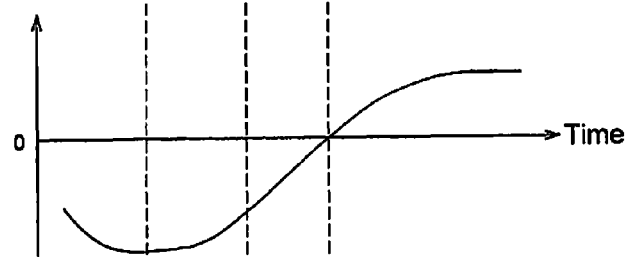
FIG. 12C  FNR position
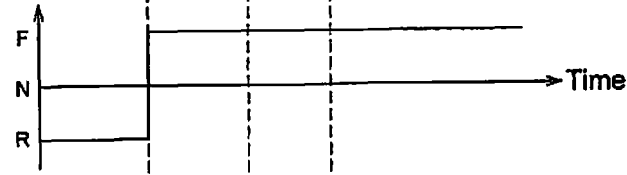
FIG. 12D  F-clutch
FIG. 12E  R-clutch
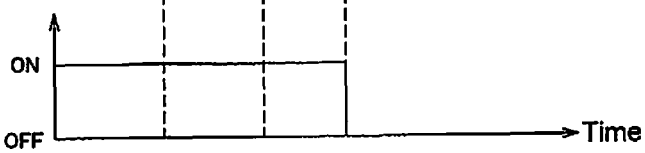

WORK VEHICLE AND CONTROL METHOD FOR SAME

CROSS-REFERENCE TO RELATED APPLICATIONS

This application is a U.S. National stage application of International Application No. PCT/JP2014/073187, filed on Sep. 3, 2014. This U.S. National stage application claims priority under 35 U.S.C. §119(a) to Japanese Patent Application No. 2013-217412, filed in Japan on Oct. 18, 2013, the entire contents of which are hereby incorporated herein by reference.

BACKGROUND

1. Field of the Invention

The present invention relates to a work vehicle and a control method for the work vehicle.

2. Background Information

An invention provided with a power transmission device (referred to hereinbelow as a "torque converter-type transmission device") having a torque converter and a multi-stage speed change gear is well known as a work vehicle, such as a wheel loader. However, recently hydraulic mechanical transmissions (HMT) have become known as power transmission devices in place of torque converter-type transmissions. As disclosed in Japanese Laid-Open Patent Publication No. 2006-329244, an HMT has a gear mechanism and a motor connected to rotating elements of the gear mechanism, and a portion of the driving power from the engine is converted to hydraulic pressure and transmitted to a travel device, and the remaining portion of the driving power is mechanically transmitted to the travel device.

The HMT is provided with a planetary gear mechanism and a hydraulic motor, for example, to allow continuous speed variation. A first element among the three elements of a sun gear, a carrier, and a ring gear of the planetary gear mechanism is coupled to an input shaft, and a second element is coupled to an output shaft. A third element is coupled to the hydraulic motor. The hydraulic motor functions as either a motor or a pump in response to the travel state of the work vehicle. The HMT is configured to enable stepless changing of the rotation speed of the output shaft by changing the rotation speed of the hydraulic motor.

An electric-mechanical transmission device (EMT) has been proposed as a technique similar to the HMT. An electric motor is used in the EMT in place of the hydraulic motor in the HMT. The electric motor functions as either a motor or a generator in response to the travel state of the work vehicle. Similar to the HMT, the EMT is configured to enable stepless changing of the rotation speed of the output shaft by changing the rotation speed of the electric motor.

SUMMARY

With the conventional torque converter-type transmission device, when the operator performs a switching operation of the vehicle moving forward from forward travel to reverse travel, the forward travel clutch (referred to below as "F-clutch") is promptly disconnected and the connection of the reverse travel clutch (referred to below as "R-clutch") is started. As a result, the vehicle decelerates smoothly and then begins to accelerate in the reverse direction. Similarly, when the operator performs a switching operation of the vehicle moving in reverse from reverse travel to forward travel, the R-clutch is promptly disconnected and the connection of the F-clutch is started. As a result, the vehicle decelerates smoothly and then accelerates in the forward direction. In general, the switching operation between forward and reverse travel while traveling is called a shuttle operation and the action of the vehicle due to the shuttle operation is called a shuttle action. The shuttle action is one of the important functions for improving operability of a wheel loader.

During the shuttle action, the F-clutch is switched to the R-clutch during forward travel of the vehicle. Alternatively, the R-clutch is switched to the F-clutch during reverse travel of the vehicle. A difference in rotation speed between the R-clutch connection time and the F-clutch connection time during the shuttle action is absorbed by a torque converter in the conventional torque converter-type transmission device.

However, it is difficult to absorb the difference in rotation speed between the R-clutch connection time and the F-clutch connection during the shuttle action due to the mechanism in the above mentioned HMT or EMT. When the switching of the R-clutch and the F-clutch is implemented during the shuttle action in the HMT or the EMT and when a large load is applied to the engine at the same time, there is a concern that excessive friction may occur in the R-clutch and the F-clutch. Therefore, it is difficult to realize the shuttle action in a work vehicle provided with a HMT or an EMT.

An object of the present invention is to realize a shuttle action in a work vehicle provided with a HMT or an EMT.

A work vehicle according to a first embodiment of the present invention is equipped with an engine, a hydraulic pump, a work implement, a travel device, a power transmission device, a control unit, a travel direction detecting unit, a forward/reverse travel operating member, and a forward/reverse travel position detecting unit. The hydraulic pump is driven by the engine. The work implement is driven by hydraulic fluid discharged from the hydraulic pump. The travel device is driven by the engine. The power transmission device transmits driving power from the engine to the travel device. The control unit controls the power transmission device. The power transmission device has an input shaft, an output shaft, a gear mechanism, a motor, and a forward/reverse travel switch mechanism. The gear mechanism includes a planetary gear mechanism and transmits the rotation of the input shaft to the output shaft. The motor is connected to a rotating element of the planetary gear mechanism. The forward/reverse travel switch mechanism includes a forward travel clutch and a reverse travel clutch. The forward travel clutch is connected and the reverse travel clutch is disconnected when the vehicle is traveling forward. The forward travel clutch is disconnected and the reverse travel clutch is connected when the vehicle is traveling in reverse. The power transmission device is configured to change the rotation speed ratio of the output shaft with respect to the input shaft by changing the rotation speed of the motor.

The control unit has a shuttle action evaluating unit, a target input shaft torque determination unit, a target output shaft torque determination unit, a storage unit, and a command torque determination unit. The shuttle action evaluating unit evaluates that the vehicle is in a shuttle action when the direction corresponding to the position of the forward/reverse travel operating member differs from the travel direction of the vehicle. The target input shaft torque determination unit determines a target input shaft torque. The target input shaft torque is a target value for a torque of the input shaft of the power transmission device. The target output shaft torque determination unit determines a target output shaft torque so that a deceleration force for decelerating the vehicle is generated on the output shaft of the power transmission device while the connection and disconnection states of the forward travel clutch and the reverse travel clutch are maintained at the state before the start of the shuttle action when the shuttle action is started. The target output shaft torque is a target value for a torque on the output shaft of the power transmission device. The storage unit stores torque-balance information. The torque-balance information prescribes a relationship between the target input shaft torque and the target output shaft torque so as to achieve a balance of the torques of the power transmission device. The command torque determination unit uses the torque-balance information to determine torque commands to the motor from the target input shaft torque and the target output shaft torque.

A deceleration force of the output shaft of the power transmission device can be achieved in the work vehicle by determining a command torque to the motor from the balance of the torques of the power transmission device. For example, when a shuttle action from forward travel to reverse travel is started, the vehicle can be decelerated by generating a deceleration force on the output shaft of the power transmission device while maintaining the state of connecting the forward travel clutch. As a result, a shuttle action in a work vehicle provided with a HMT or an EMT can be realized.

The target output shaft torque determination unit preferably gradually changes the deceleration force during the shuttle action. In this case, the work vehicle can be decelerated smoothly during the shuttle action.

The work vehicle is preferably further provided with an accelerator operating member, an accelerator operation detecting unit for detecting an operating amount of the accelerator operating member, a brake operating member, and a brake operation detecting unit for detecting an operating amount of the brake operating member. The target output shaft torque determination unit determines a predetermined reference deceleration force on the basis of the operating amount of the accelerator operating member and the operating amount of the brake operating member. The target output shaft torque determination unit gradually changes the deceleration force approaching the reference deceleration force during the shuttle action. In this case, operability can be improved because a deceleration force that takes into account the operating desire of the operator can be generated.

The target output shaft torque determination unit preferably gradually changes the deceleration force from the deceleration force when the shuttle action starts to the reference deceleration force when the deceleration force for decelerating the vehicle at the start of the shuttle action is generated on the output shaft of the power transmission device. In this case, the work vehicle can be decelerated smoothly from before the start of the shuttle action until after the start of the shuttle action.

When a torque for accelerating the vehicle is generated on the output shaft of the power transmission device when the shuttle action starts, the target output shaft torque determination unit preferably determines the target output shaft torque so that the torque on the output shaft of the power transmission device changes to zero. The target output shaft torque determination unit gradually changes the deceleration force to the reference deceleration force after the torque on the output shaft of the power transmission device reaches zero. In this case, the work vehicle can be decelerated smoothly from before the start of the shuttle action until after the start of the shuttle action.

When a torque for accelerating the vehicle is generated in the output shaft of the power transmission device when the shuttle action starts, the target output shaft torque determination unit preferably determines the target output shaft torque so that the torque on the output shaft of the power transmission device changes to zero in a predetermined first time period. The target output shaft torque determination unit changes the deceleration force approaching the reference deceleration force in a second time period that is longer than the first time period after the first time period has elapsed. In this case, the work vehicle can be decelerated quickly and smoothly after the start of the shuttle action.

The work vehicle preferably is further provided with an engine rotation speed detecting unit for detecting an engine rotation speed. The target output shaft torque determination unit calculates a deceleration power regenerated by the deceleration force. The target output shaft torque determination unit determines the target output shaft torque so that the upper limit of the deceleration power is reduced in response to an increase in the engine rotation speed when the engine rotation speed is equal to or greater than a predetermined value. In this case, an excessive increase in the engine rotation speed can be suppressed by suppressing the regenerated deceleration power.

The work vehicle preferably is further provided with an energy reservoir unit for storing energy generated in the motor. The control unit further has a target energy reservoir power determination unit. The target energy reservoir power determination unit determines a target energy reservoir power for accumulating energy in the energy reservoir unit. The target output shaft torque determination unit calculates the deceleration power regenerated by the deceleration force. The target input shaft torque determination unit determines the target input shaft torque on the basis of the target energy reservoir power and the deceleration power. In this case, a desired deceleration force can be ensured and a desired energy reservoir amount can be ensured when the target input shaft torque is determined by taking into account the regenerated deceleration power and the target energy reservoir power, and consequently fuel consumption can be improved.

A control method according to a second embodiment of the present invention is a control method for a work vehicle provided with a power transmission device. The power transmission device has an input shaft, an output shaft, a gear mechanism, a motor, and a forward/reverse travel switch mechanism. The gear mechanism includes a planetary gear mechanism and transmits the rotation of the input shaft to the output shaft. The motor is connected to a rotating element of the planetary gear mechanism. The forward/reverse travel switch mechanism includes a forward travel clutch and a reverse travel clutch. The forward travel clutch is connected and the reverse travel clutch is disconnected when the vehicle is traveling forward. The forward travel clutch is disconnected and the reverse travel clutch is connected when the vehicle is traveling in reverse. The power transmission device is configured to change the rotation speed ratio of the output shaft with respect to the input shaft by changing the rotation speed of the motor.

The control method includes the following steps. In a first step, the vehicle is determined as being in a shuttle action when the direction relative to the position of the forward/reverse travel operating member differs from the travel direction of the vehicle. In a second step, a target input shaft torque is determined. The target input shaft torque is a torque target value on the input shaft of the power transmission device. In a third step, a target output shaft torque is determined so that a deceleration force for decelerating the vehicle is generated on the output shaft of the power transmission device in a state in which the connection and disconnection states of the forward travel clutch and the reverse travel clutch are maintained at a state before the start of the shuttle action when the shuttle action is started. The target output shaft torque is a target value for a torque of the output shaft of the power transmission device. In a fourth step, a command torque for the motor is determined using torque-balance information from the target input shaft torque and the target output shaft torque. The torque-balance information prescribes a relationship between the target input shaft torque and the target output shaft torque to achieve a balance of the torques of the power transmission device.

A deceleration force of the output shaft of the power transmission device can be achieved in the control method of the work vehicle by determining a command torque to the motor from the balance of the torques of the power transmission device. For example, when a shuttle action from forward travel to reverse travel is started, the vehicle can be decelerated by generating a deceleration force on the output shaft of the power transmission device while maintaining the state of connecting the forward travel clutch. As a result, a shuttle action in a work vehicle provided with a HMT or an EMT can be realized.

According to the present invention, the shuttle action in a work vehicle provided with a HMT or an EMT can be realized.

BRIEF DESCRIPTION OF DRAWINGS

FIGS. 12A-12E is a timing chart illustrating changes in parameters of the work vehicle during a shuttle action.

DESCRIPTION OF EXEMPLARY EMBODIMENTS

Figure 1:
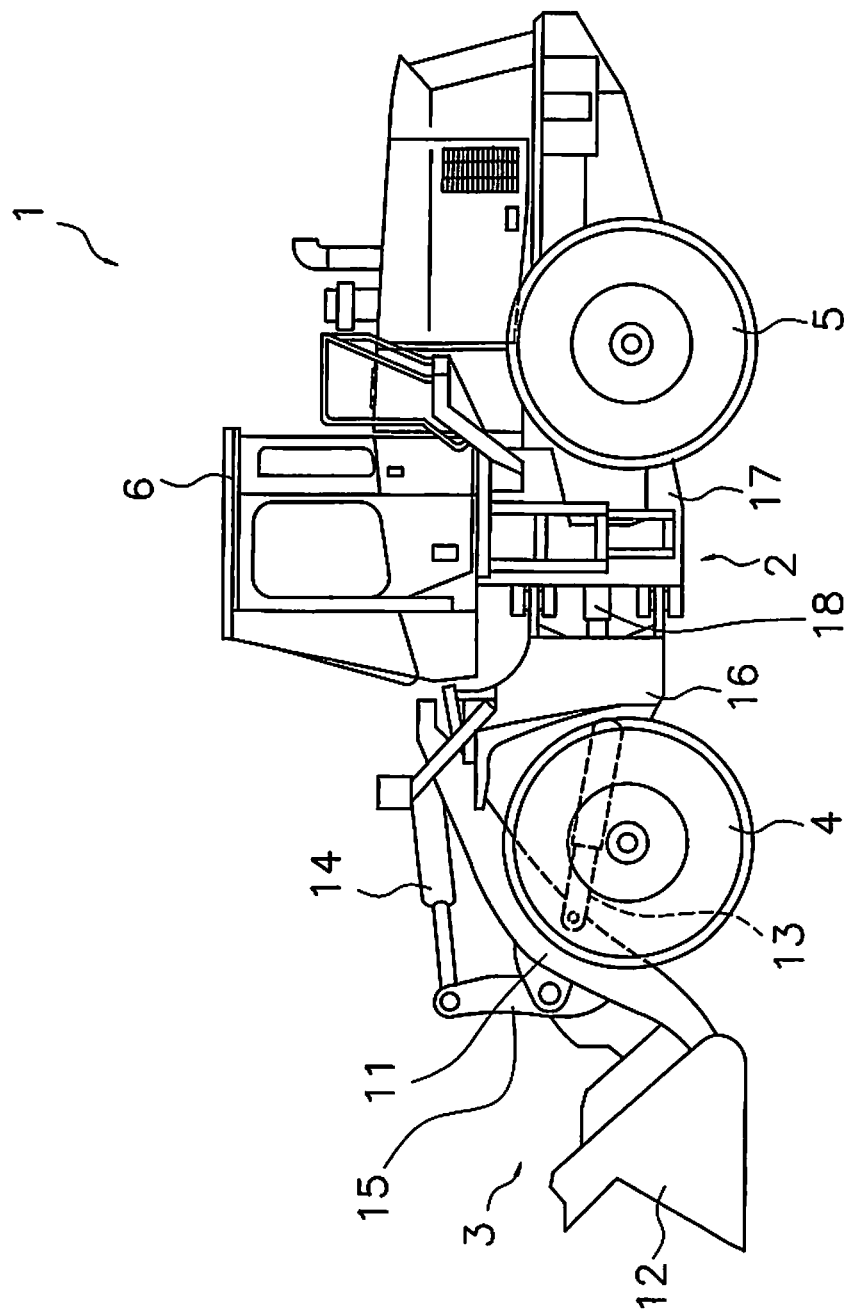
FIG. 1 is a side view of a work vehicle according to an exemplary embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The work implement 3 and the traveling wheels 4 and 5 are attached to the vehicle body frame 2. The work implement 3 is driven by hydraulic fluid from a below mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 is attached to the vehicle body frame 2. The operating cabin 6 is mounted on the vehicle body frame 2. A seat for the operator to be seated and a below mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below mentioned steering pump 30.

Figure 2:
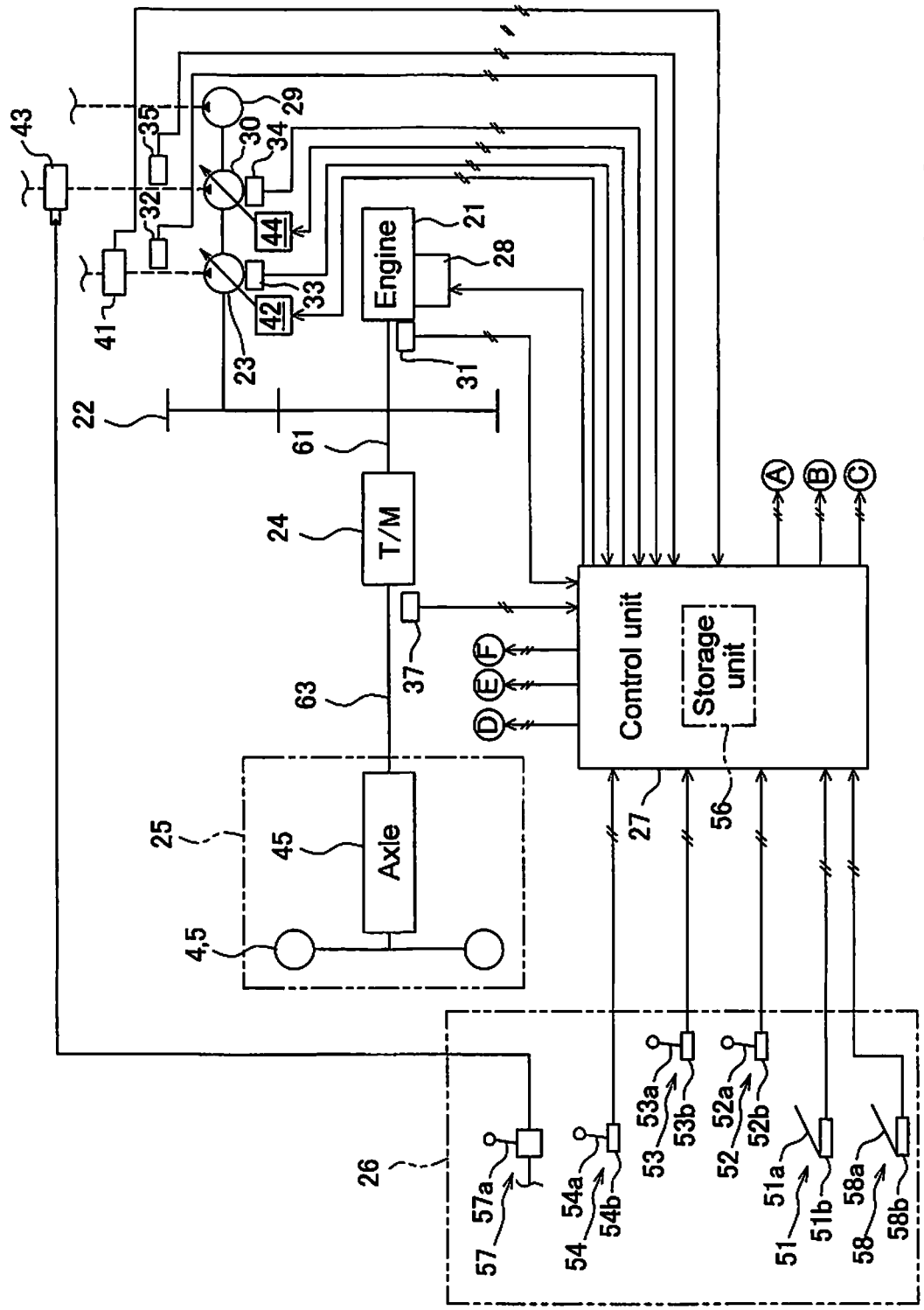
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off (PTO) 22, a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the engine 21 to the hydraulic pumps 23, 30, and 29 and the power transmission device 24.

The work implement pump 23 is driven by driving power from the engine 21. The hydraulic fluid discharged from the work implement pump 23 is supplied to the lift cylinder 13 and the bucket cylinder 14 through a work implement control valve 41. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting unit 33. The first tilt angle detecting unit 33 detects the tilt angle of the work implement pump 23 and transmits a detection signal indicating the tilt angle to the control unit 27.

The steering pump 30 is driven by driving power from the engine 21. The hydraulic fluid discharged from the steering pump 30 is supplied to the above mentioned steering cylinder 18 through a steering control valve 43. The work vehicle 1 is equipped with a steering pump pressure detecting unit 35. The steering pump pressure detecting unit 35 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting unit 34. The second tilt angle detecting unit 34 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power transmission device 24 via below mentioned clutch control valves VF, VR, VL, and VH.

The PTO 22 transmits a portion of the driving power from the engine 21 to the power transmission device 24 through an input shaft 61. The power transmission device 24 transmits the driving power from the engine 21 to the travel device 25. The power transmission device 24 changes the speed and outputs the driving power from the engine 21. An explanation of the configuration of the power transmission device 24 is provided in detail below.

The travel device 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 functions as a traveling direction detecting unit that detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by the operator. The operating device 26 has an accelerator operating device 51, a work implement operating device 52, a speed change operating device 53, a forward/reverse travel operating device 54 (referred to below as "FR operating device 54"), a steering operating device 57, and a brake operating device 58.

The accelerator operating device 51 has an accelerator operating member 51a and an accelerator operation detecting unit 51b. The accelerator operating member 51a is operated to set a target rotation speed of the engine 21. The accelerator operation detecting unit 51b detects an operating amount (referred to below as "accelerator operating amount") of the accelerator operating member 51a. The accelerator operation detecting unit 51b transmits a detection signal indicating the accelerator operating amount to the control unit 27.

The work implement operating device 52 has a work implement operating member 52a and a work implement operation detecting unit 52b. The work implement operating member 52a is operated to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects an operating amount of the work implement operating member 52a by detecting a position of the work implement operating member 52a.

The speed change operating device 53 has a speed change operating member 53a and a speed change operation detecting unit 53b. The operator is able to select a speed range of the power transmission device 24 by operating the speed change operating member 53a. The speed change operation detecting unit 53b detects a position of the speed change operating member 53a. The position of the speed change operating member 53a corresponds to a plurality of speed ranges such as a first speed and a second speed and the like. The speed change operation detecting unit 53b outputs a detection signal indicating the position of the speed change operating member 53a to the control unit 27.

The FR operating device 54 has a forward/reverse travel operating member 54a (referred to below as "FR operating member 54a") and a forward/reverse travel position detecting unit 54b (referred to below as a "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects a position of the FR operating member 54a. The FR position detecting unit 54b outputs a detection signal indicating the position of the FR operating member 54a to the control unit 27.

The steering operating device 57 has a steering operating member 57a. The steering operating device 57 drives a steering control valve 43 by supplying pilot hydraulic pressure based on an operation of the steering operating member 57a to the steering control valve 43. The steering operating device 57 may drive the steering control valve 43 by converting an operation of the steering operating member 57a to an electrical signal. The operator is able to change the travel direction of the work vehicle 1 to the right or left by operating the steering operating member 57a.

The brake operating device 58 has a brake operating member 58a and a brake operation detecting unit 58b. The operator is able to operate a deceleration force of the work vehicle 1 by operating the brake operating member 58a. The brake operation detecting unit 58b detects an operating amount of the brake operating member 58a (referred to below as "brake operating amount"). The brake operation detecting unit 58b outputs a detection signal indicating the brake operating amount to the control unit 27. The pressure of the brake oil may be used as the brake operating amount.

The control unit 27 has a calculation device, such as a CPU, and a memory, such as a RAM or a ROM, and conducts various types of processing for controlling the work vehicle 1. The control unit 27 has a storage unit 56. The storage unit 56 stores various types of programs and data for controlling the work vehicle 1.

The control unit 27 transmits a command signal indicating a command throttle value to the fuel injection device 28 so that a target rotation speed of the engine 21 is obtained in response to the accelerator operating amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52b. As a result, the hydraulic cylinders 13 and 14 expand or contract to operate the work implement 3.

The control unit 27 controls the power transmission device 24 on the basis of the detection signals from each of the detecting units. The control of the power transmission device 24 by the control unit 27 is described in detail below.

Figure 3:
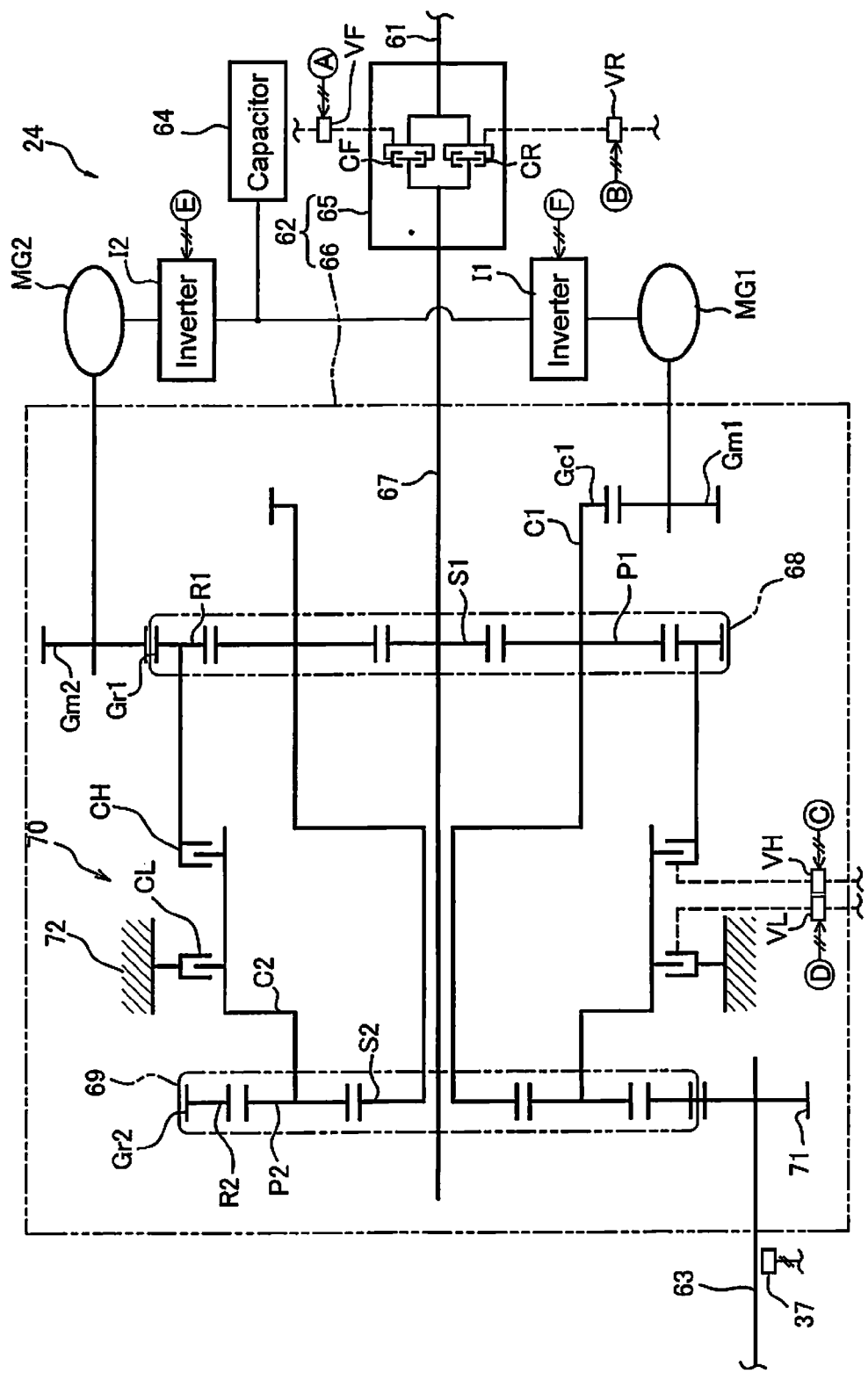
FIG. 3 is a schematic view of a configuration of a power transmission device.

An explanation of the configuration of the power transmission device 24 is provided in detail below. FIG. 3 is a schematic view of a configuration of the power transmission device 24. As illustrated in FIG. 3, the power transmission device 24 is provided with the input shaft 61, a gear mechanism 62, the output shaft 63, a first motor MG1, a second motor MG2, and a capacitor 64. The input shaft 61 is connected to the above mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above mentioned travel device 25, and transmits the rotation from the gear mechanism 62 to the above mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65, and a speed change mechanism 66.

The FR switch mechanism 65 has a forward travel clutch CF (referred to below as "F-clutch CF"), a reverse travel clutch CR (referred to below as "R-clutch CR"), and various other gears not illustrated. The F-clutch CF and the R-clutch CR are hydraulic clutches and hydraulic fluid is supplied from the transmission pump 29 to the clutches CF and CR. The hydraulic fluid for the F-clutch CF is controlled by an F-clutch control valve VF. The hydraulic fluid for the R-clutch CR is controlled by an R-clutch control valve VR. The clutch control valves CF and CR are controlled by command signals from the control unit 27.

The direction of the rotation outputted from the FR switch mechanism 65 is switched due to the switching between ON (connection)/OFF (disconnection) of the F-clutch CF and ON (connection)/OFF (disconnection) of the R-clutch CR. Specifically, the F-clutch CF is ON and the R-clutch CR is OFF when the vehicle is traveling forward. The F-clutch CF is OFF and the R-clutch CR in ON when the vehicle is traveling in reverse.

The speed change mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same shaft as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the drive-power transmission path of the power transmission device 24 between a high-speed mode (Hi mode) in which the vehicle speed is high and a low-speed mode (Lo mode) in which the vehicle speed is low. The Hi/Lo switch mechanism 70 has an H-clutch CH that is ON during the Hi mode and an L-clutch CL that is ON during the Lo mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. The clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied to the first motor MG1 to activate torque in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter I1 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27.

The capacitor 64 functions as an energy reservoir unit for storing energy generated by the motors MG1 and MG2. That is, the capacitor 64 stores electrical power generated by the motors MG1 and MG2 when the total electrical power generation amount of the motors MG1 and MG2 is high. The capacitor 64 releases electrical power when the total electrical power consumption amount of the motors MG1 and MG2 is high. That is, the motors MG1 and MG2 are driven by electrical power stored in the capacitor 64. A battery may be used in place of a capacitor.

The control unit 27 receives detection signals from the various detecting units and applies command signals for indicating the command torques for the motors MG1 and MG2 to the inverters I1 and I2. The control unit 27 may output rotation speed commands for the motors MG1 and MG2. In this case, the inverters I1 and I2 control the motors MG1 and MG2 by calculating command torques in response to the rotation speed commands. The control unit 27 also applies command signal for controlling the clutch hydraulic pressure of the clutches CF, CR, CH, and CL to the clutch control valves VF, VR, VH, and VL. As a result, the speed change ratio and the output torque of the power transmission device 24 are controlled. The following is an explanation of the operations of the power transmission device 24.

Figure 4:
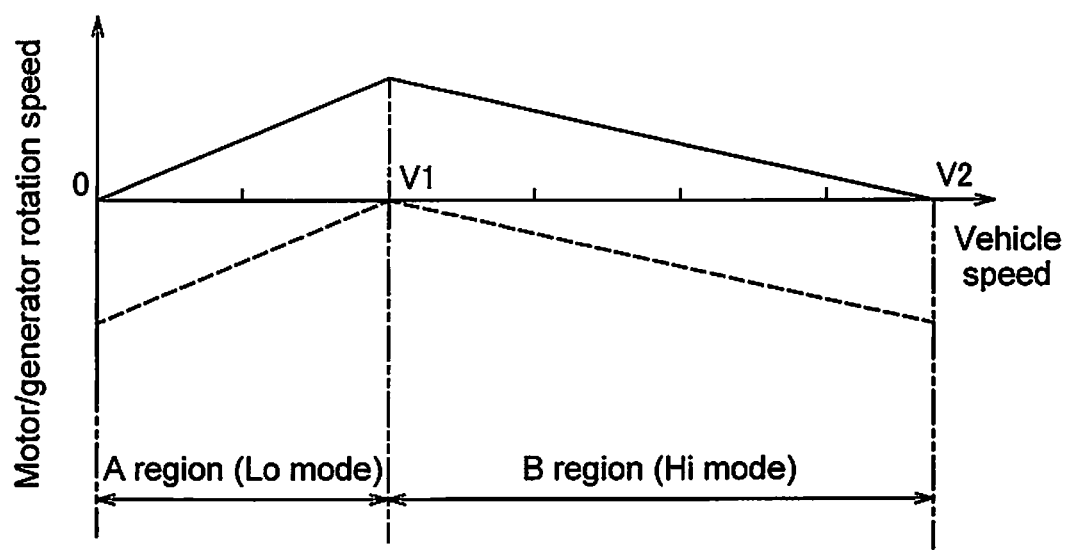
FIG. 4 illustrates changes in rotation speeds of a first motor and a second motor with respect to the vehicle speed.

An outline of operations of the power transmission device 24 when the vehicle speed increases from zero in the forward travel side while the rotation speed of the engine 21 remains fixed, will be explained with reference to FIG. 4. FIG. 4 illustrates the rotation speeds of the motors MG1 and MG2 with respect to the vehicle speed. When the rotation speed of the engine 21 is fixed, the vehicle speed changes in response to the rotation speed ratio of the power transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power transmission device 24. That is, FIG. 4 illustrates the relationship between the rotation speeds of the motors MG1 and MG2 and the rotation speed ratio of the power transmission device 24. The solid line in FIG. 4 represents the rotation speed of the first motor MG1, and the dashed line represents the rotation speed of the second motor MG2.

In an A region (Lo mode) with a vehicle speed from zero to V1, the L-clutch CL is ON (connected) and the H-clutch CH is OFF (disconnected). Because the H-clutch CH is OFF in the A region, the second carrier C2 and the first ring gear R1 are disconnected. Because the L-clutch CL is ON, the second carrier C2 is fixed.

The driving power from the engine 21 in the A region is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the A region, and the electrical power generated by the second motor MG2 is supplied to the first motor MG1 or a portion of the generated electrical power is stored in the capacitor 64.

The first motor MG1 functions mainly as an electric motor in the A region. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

In a B region (Hi mode) in which the vehicle speed exceeds V1, the H-clutch CH is ON (connected) and the L-clutch CL is OFF (disconnected). Because the H-clutch CH is ON in the B region, the second carrier C2 and the first ring gear R1 are connected. Because the L-clutch CL is OFF, the second carrier C2 is disconnected. Therefore, the rotation speed of the first ring gear R1 and the second carrier C2 match.

The driving power from the engine 21 in the B region is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the B region, and thus the electrical power generated by the first motor MG1 is supplied to the second motor MG2 or a portion of the electrical power generated by the first motor MG1 is stored in the capacitor 64.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power joined in the second ring gear R2 in this way is transmitted through the second ring outer periphery gear Gr2 and the output gear 71 to the output shaft 63.

While forward travel driving has been discussed above, the operations of reverse travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device 24 by controlling the motor torque of the first motor MG1 and the second motor MG2. That is, the control unit 27 controls the tractive force of the work vehicle 1 by controlling the motor torque of the first motor MG1 and the second motor MG2.

A method for determining the command values of the motor torque (referred to below as "command torque") to the first motor MG1 and the second motor MG2 during a normal action is explained below. A "normal action" signifies an action when the direction corresponding to the position of the FR operating member 54a and the travel direction of the vehicle match. Specifically, an action in which the FR operating member 54a is in the forward travel position (F) and the work vehicle 1 is traveling forward is a normal action. Moreover, an action in which the FR operating member 54a is in the reverse travel position (R) and the work vehicle 1 is traveling in reverse is a normal action. In contrast, a below mentioned "shuttle action" is an action in which the direction corresponding to the position of the FR operating member 54a differs from the traveling direction of the vehicle. Specifically, an action in which the FR operating member 54a is in the forward travel position (F) and the work vehicle 1 is traveling in reverse is a shuttle action. Moreover, an action in which the FR operating member 54a is in the reverse travel position (R) and the work vehicle 1 is traveling forward is a shuttle action.

Figure 5:
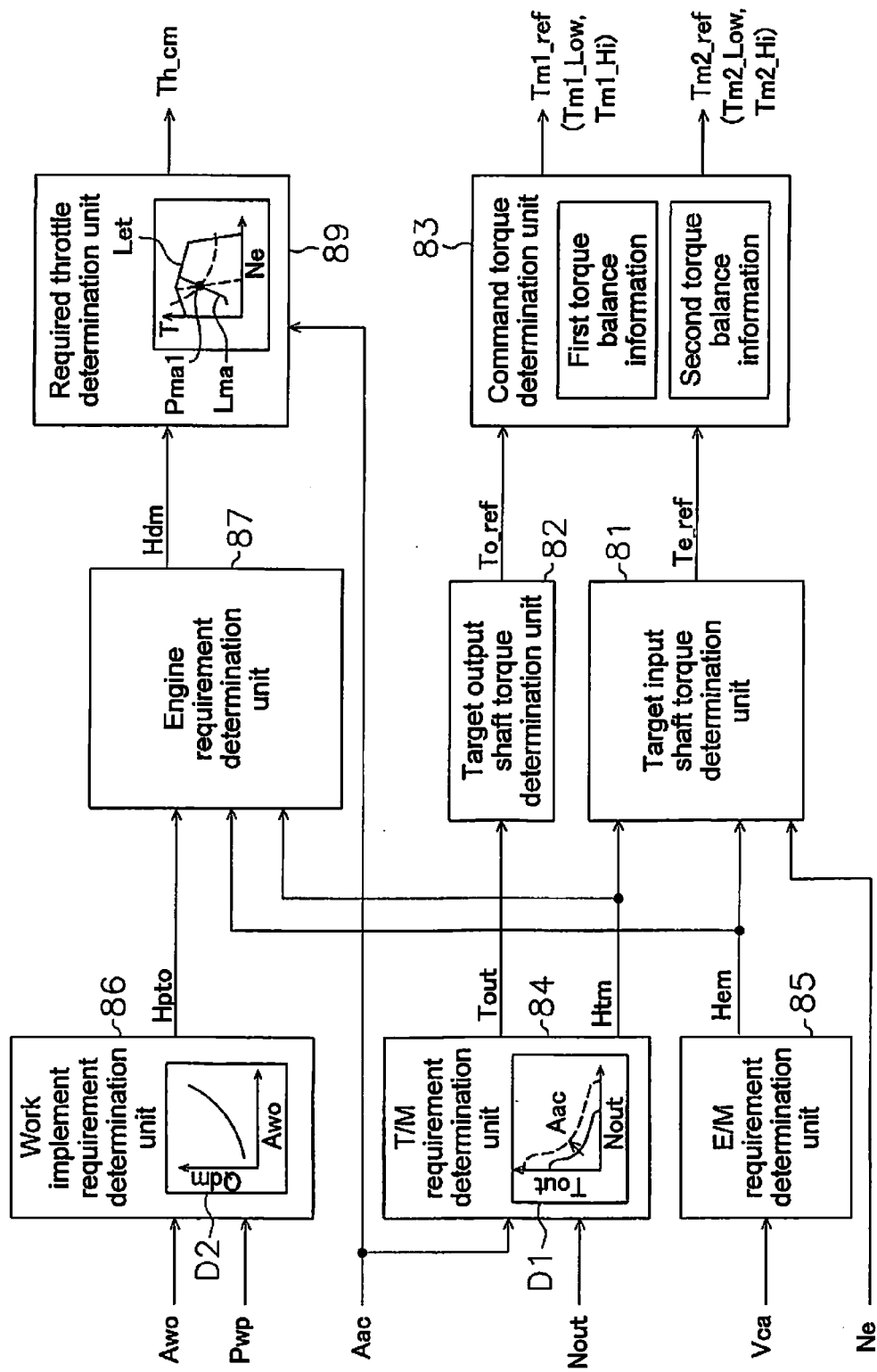
FIG. 5 is a control block diagram indicating processing executed by the control unit during a normal action.

FIG. 5 is a control block diagram illustrating processing executed by the control unit 27 during a normal action. The control unit 27 has a transmission requirement determination unit 84, an energy management requirement determination unit 85, and a work implement requirement determination unit 86 as illustrated in FIG. 5.

The transmission requirement determination unit 84 determines a required tractive force Tout on the basis of an accelerator operating amount Aac and an output rotation speed Nout. Specifically, the transmission requirement determination unit 84 determines the required tractive force Tout from the output rotation speed Nout on the basis of required tractive force characteristics information D1 stored in the storage unit 56. The required tractive force characteristics information D1 is data indicating the required tractive force characteristics for defining the relationship between the output rotation speed Nout and the required tractive force Tout. The required tractive force characteristics are changed in response to the accelerator operating amount. The required tractive force characteristics correspond to predetermined vehicle speed-tractive force characteristics. The transmission requirement determination unit 84 uses the required tractive force characteristics corresponding to the accelerator operating amount to determine the required tractive force Tout from the output rotation speed Nout and to determine a transmission required horsepower Htm that is a product of the output rotation speed Nout and the required tractive force Tout.

The energy management requirement determination unit 85 determines an energy management required horsepower Hem on the basis of a remaining amount of electrical power in the capacitor 64. The energy management required horsepower Hem is a horsepower required by the power transmission device 24 for charging the capacitor 64. The energy management requirement determination unit 85 determines the current capacitor capacity from a voltage Vca of the capacitor 64. The energy management requirement determination unit 85 increases the energy management required horsepower Hem as the current capacitor capacity becomes smaller.

The work implement requirement determination unit 86 determines a work implement required horsepower Hpto on the basis of a work implement pump pressure Pwp and an operating amount Awo (referred to below as "work implement operating amount Awo") of the work implement operating member 52a. In the present exemplary embodiment, the work implement required horsepower Hpto is a horsepower distributed to the work implement pump 23. However, the work implement required horsepower Hpto may include a horsepower distributed to the steering pump 30 and/or the transmission pump 29. Specifically, the work implement requirement determination unit 86 determines a required flow rate Qdm of the work implement pump 23 from the work implement operating amount Awo on the basis of required flow rate information D2. Required flow rate information D2 is stored in the storage unit 56 and uses a map or a calculation formula to define the relationship between the required flow rate Qdm and the work implement operating amount Awo. The work implement requirement determination unit 86 determines the work implement required horsepower Hpto from the required flow rate Qdm and the work implement pump pressure Pwp.

The control unit 27 has a target output shaft torque determination unit 82, a target input shaft torque determination unit 81, and a command torque determination unit 83.

The target output shaft torque determination unit 82 determines a target output shaft torque To_ref. The target output shaft torque To_ref is a target value for the torque to be outputted from the power transmission device 24. The target output shaft torque determination unit 82 determines the target output shaft torque To_ref on the basis of the required tractive force Tout determined by the transmission requirement determination unit 84. Specifically, the target output shaft torque To_ref is determined by multiplying the required tractive force Tout by a predetermined distribution ratio. The predetermined distribution ratio is set, for example, so that the total of the work implement required horsepower Hpto, the transmission required horsepower Htm, and the energy management required horsepower Hem does not exceed the output horsepower from the engine 21.

The target input shaft torque determination unit 81 determines a target input shaft torque Te_ref. The target input shaft torque Te_ref is a target value for the torque to be inputted to the power transmission device 24. The target input shaft torque determination unit 81 determines the target input shaft torque Te_ref on the basis of the transmission required horsepower Htm and the energy management required horsepower Hem. Specifically the target input shaft torque determination unit 81 calculates the target input shaft torque Te_ref by multiplying the engine rotation speed by the sum of the energy management required horsepower Hem and the value of the transmission required horsepower Htm multiplied by the predetermined distribution ratio. The transmission required horsepower Htm is calculated by multiplying the above mentioned required tractive force Tout by the current output rotation speed Nout.

The command torque determination unit 83 uses torque-balance information to determine command torques $Tm1\_ref$ and $Tm2\_ref$ for the motors MG1 and MG2 from the target input shaft torque Te_ref and the target output shaft torque To_ref. The torque-balance information defines a relationship between the target input shaft torque Te_ref and the target output shaft torque To_ref so as to achieve a balance of the torques of the power transmission device 24. The torque-balance information is stored in the storage unit 56.

As described above, the transmission paths of the driving power in the power transmission device 24 are different for the Lo mode and the Hi mode. As a result, the command torque determination unit 83 uses different torque-balance information to determine the command torques $Tm1\_ref$ and $Tm2\_ref$ for the motors MG1 and MG2 in the Lo mode and the Hi mode. Specifically, the command torque determination unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power transmission device 24.

$$Ts1\_Low = Te\_ref * r\_fr$$

$$Tc1\_Low = Ts1\_Low * (-1) * ((Zr1/Zs1) + 1)$$

$$Tr2\_Low = To\_ref * (Zod/Zo)$$

$$Ts2\_Low = Tr2\_Low * (Zs2/Zr2)$$

$$Tcp1\_Low = Tc1\_Low + Ts2\_Low$$

$$Tm1\_Low = Tcp1\_Low * (-1) * (Zp1/Zp1d)$$

$$Tr1\_Low = Ts1\_Low * (Zr1/Zs1)$$

$$Tm2\_Low = Tr1\_Low * (-1) * (Zp2/Zp2d) \quad \text{(Equation 1)}$$

The command torque determination unit 83 uses second torque-balance information represented by equation 2 below to determine command torques Tm1_Hi and Tm2_Hi for the motors MG1 and MG2 in the Hi mode. In the present exemplary embodiment, the second torque-balance information is an equation for balancing the torques of the power transmission device 24.

$$Ts1\_Hi = Te\_ref * r\_fr$$

$$Tc1\_Hi = Ts1\_Hi * (-1) * ((Zr1/Zs1)+1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2)+1)$$

$$Tcp2\_Hi = Tr1\_Hi + Tc2\_Hi$$

$$Tm2\_Hi = Tcp2\_Hi * (-1) * (Zp2/Zp2d) \quad \text{(Equation 2)}$$

The contents of the parameters in each torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 decelerates the engine rotation speed at 1/r_fr to output. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

The control of the engine 21 by the control unit 27 is described in detail below. As described above, the control unit 27 controls the engine by transmitting command signals to the fuel injection device 28. A method for determining the command throttle values for the fuel injection device 28 will be explained below. The control unit 27 has an engine requirement determination unit 87 and a required throttle determination unit 89.

The engine requirement determination unit 87 determines an engine required horsepower Hdm on the basis of the work implement required horsepower Hpto, the transmission required horsepower Htm, and the energy management required horsepower Hem. Specifically, the engine requirement determination unit 87 determines the engine required horsepower Hdm by adding the work implement required horsepower Hpto, the transmission required horsepower Htm, and the energy management required horsepower Hem.

The required throttle determination unit 89 determines a command throttle value Th_cm from the engine required horsepower Hdm and the accelerator operating amount Aac. The required throttle determination unit 89 uses an engine torque line Let and a matching line Lma stored in the storage unit 56 to determine the command throttle value TH_cm. The engine torque line Let defines a relationship between the output torque of the engine 21 and the engine rotation speed Ne. The matching line Lma is information for determining a first required throttle value from the engine required horsepower Hdm.

The required throttle determination unit 89 determines the first required throttle value so that the engine torque line Let and the matching line Lma match at a matching point Pma1 where the output torque of the engine 21 becomes the torque corresponding to the engine required horsepower Hdm. The required throttle determination unit 89 determines the smaller from the first required throttle value and a second required throttle value corresponding to the accelerator operating amount Aac as the command throttle value Th_cm.

Figure 6:
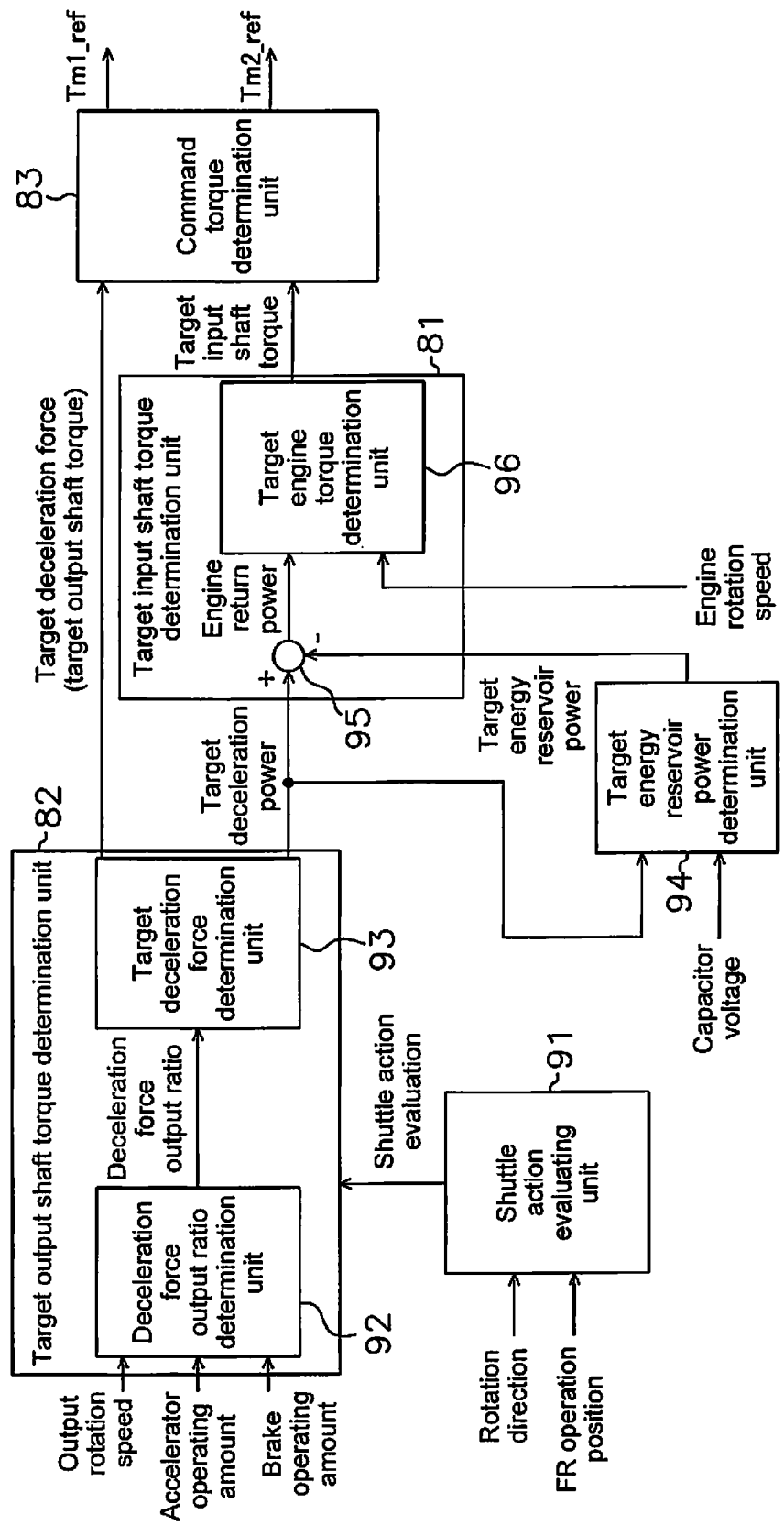
FIG. 6 is a control block diagram indicating processing executed by the control unit during a shuttle action.

A method for determining the command torque to the first motor MG1 and the second motor MG2 during a shuttle action is explained below. FIG. 6 is a control block diagram illustrating processing executed by the control unit 27 during a shuttle action. As illustrated in FIG. 6, the control unit 27 has a shuttle action evaluating unit 91.

The shuttle action evaluating unit 91 evaluates whether the work vehicle 1 is in a shuttle action on the basis of the rotating direction of the output shaft 63 and the position of the FR operating member 54a. Specifically, the shuttle action evaluating unit 91 determines that the vehicle is in the shuttle action when the travel direction defined by the position of the FR operating member 54a differs from the actual travel direction of the vehicle. That is, when the position of the FR operating member 54a is the forward travel position (F) and the work vehicle 1 is traveling in reverse, the shuttle action evaluating unit 91 determines that the vehicle is in a shuttle action. When the position of the FR operating member 54a is the reverse travel position (R) and the work vehicle 1 is traveling forward, the shuttle action evaluating unit 91 also determines that the vehicle is in a shuttle action.

When it is determined by the shuttle action evaluating unit 91 that the shuttle action has started, the target output shaft torque determination unit 82 determines the target output shaft torque to generate a deceleration force for decelerating the work vehicle 1 on the output shaft 63 of the power transmission device 24. Specifically, the target output shaft torque determination unit 82 has a deceleration force output ratio determination unit 92 and a target deceleration force determination unit 93.

Figure 7:
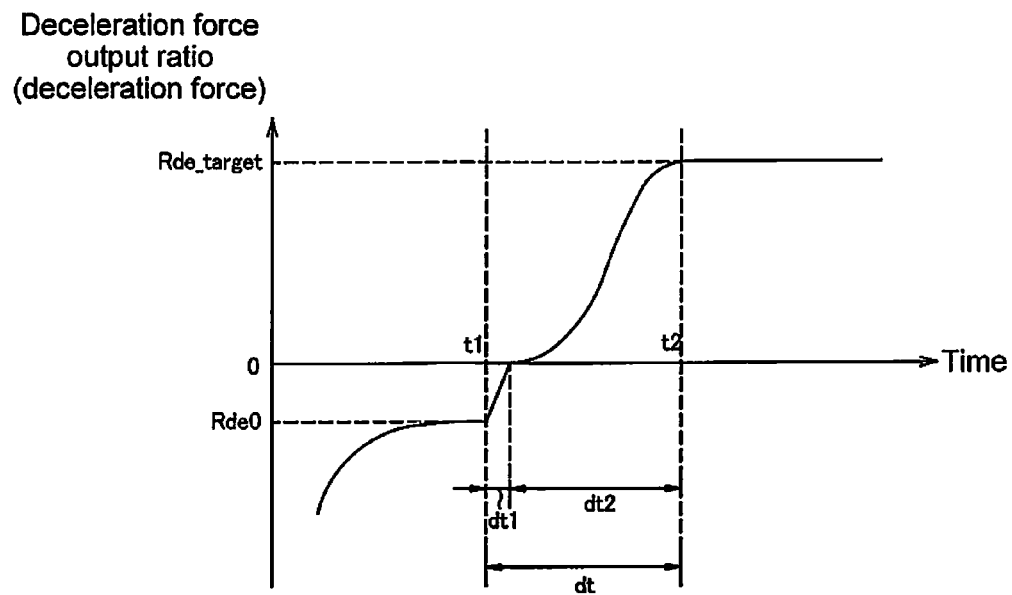
FIG. 7 illustrates changes in a deceleration force output ratio during a shuttle action.
Figure 8:
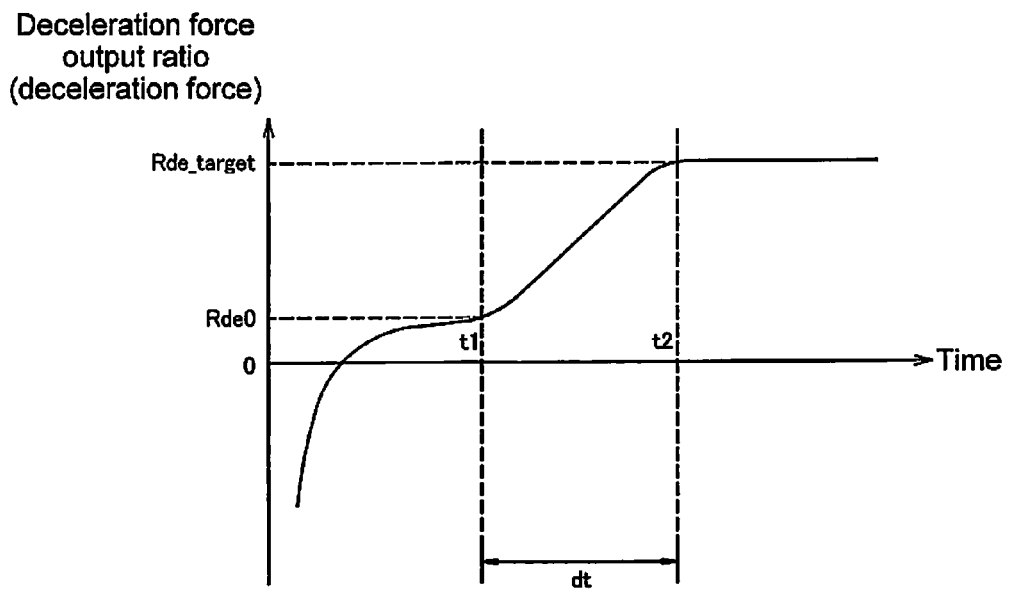
FIG. 8 illustrates changes in a deceleration force output ratio during a shuttle action.

The deceleration force output ratio determination unit 92 determines a deceleration force output ratio. The deceleration force output ratio is a ratio of the deceleration force relative to a predetermined maximum output shaft torque. As described below, the target deceleration force determination unit 93 calculates a target deceleration force by multiplying the maximum output shaft torque by the deceleration force output ratio. Therefore, the deceleration force increases as the deceleration force output ratio increases. FIGS. 7 and 8 are graphs depicting changes in the deceleration force output ratio determined by the deceleration force output ratio determination unit 92. The deceleration force output ratio when a deceleration force is generated is a positive value, and the deceleration force output ratio when an acceleration force is generated is a negative value. As illustrated in FIGS. 7 and 8, the deceleration force output ratio determination unit 92 gradually increases the deceleration force output ratio in response to the passage of time from a starting time point t1 of the shuttle action.

Specifically, the deceleration force output ratio determination unit 92 determines an initial deceleration force output ratio Rde0 and a reference deceleration force output ratio Rde_target from the rotation speed of the output shaft 63, and increases the deceleration force output ratio so that the deceleration force output ratio reaches the reference deceleration force output ratio Rde_target from the initial deceleration force output ratio Rde0 during a predetermined time period dt from the starting time point t1 to a time point t2. As a result, the target output shaft torque determination unit 82 gradually increases the deceleration force during the shuttle action.

The initial deceleration force output ratio Rde0 is a deceleration force output ratio corresponding to the target output shaft torque To_ref immediately before the start of the shuttle action. The reference deceleration force output ratio Rde_target is determined on the basis of the accelerator operating amount Aac and the brake operating amount. The deceleration force output ratio determination unit 92 determines the reference deceleration force output ratio Rde_target from the accelerator operating amount and the brake operating amount on the basis of deceleration force output ratio information. The deceleration force output ratio information is information that defines the relationship between the accelerator operating amount, the brake operating amount, and the reference deceleration force output ratio Rde_target, and is stored in the storage unit 56.

Figures 9, 10, 11:
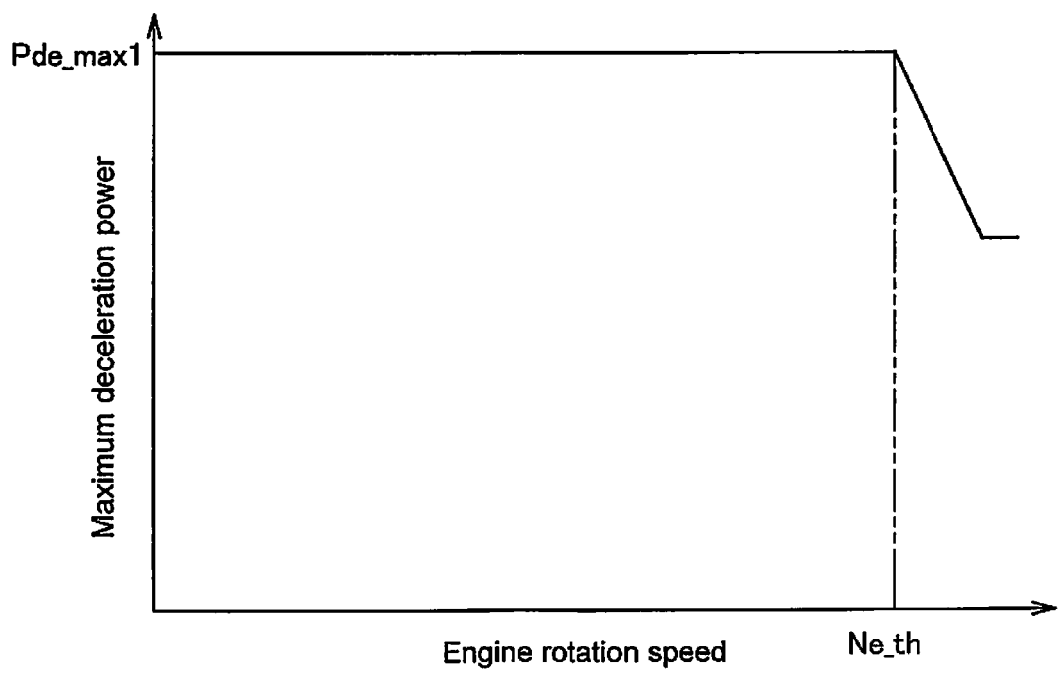
FIG. 9 is a table illustrating an example of deceleration force output ratio information.
FIG. 10 is a table illustrating relationships between speed ranges and maximum output shaft torques.
FIG. 11 illustrates a relationship between maximum deceleration power and the engine rotation speed.

FIG. 9 is a table illustrating an example of the deceleration force output ratio information. The deceleration force output ratio information is not limited to a table and may be in the form of a map or an equation. R1 to r10 in FIG. 9 represent values of the reference deceleration force output ratio Rde_target. The values of the reference deceleration force output ratio Rde_target conform to the following relationship: $0<r1<r2<\ldots<r10<1$. As illustrated in FIG. 9, the reference deceleration force output ratio Rde_target increases as the brake operating amount increases. The reference deceleration force output ratio Rde_target increases as the accelerator operating amount increases.

As mentioned above, the deceleration force output ratio determination unit 92 gradually increases the deceleration force output ratio in response to the passage of time from the starting time point t1 of the shuttle action. FIG. 7 illustrates changes in the deceleration force output ratio when the initial deceleration force output ratio Rde0 is a negative value, that is, when a torque for accelerating the vehicle is generated on the output shaft 63 of the power transmission device 24 at the starting time point t1 of the shuttle action. FIG. 8 illustrates changes in the deceleration force output ratio when the initial deceleration force output ratio Rde0 is a zero or higher, that is, when a deceleration force for decelerating the vehicle is generated on the output shaft 63 of the power transmission device 24 at the starting time point t1 of the shuttle action.

As illustrated in FIG. 7, when the initial deceleration force output ratio Rde0 is negative at the starting time point t1 of the shuttle action, the deceleration force output ratio determination unit 92 first increases the deceleration force output ratio from the initial deceleration force output ratio Rde0 up to zero in a linear manner, and then increases the deceleration force output ratio to approach the reference deceleration force output ratio Rde_target in a curved manner. Specifically, the deceleration force output ratio determination unit 92 increases the deceleration force output ratio from the initial deceleration force output ratio Rde0 to zero during a predetermined first time period dt1 from the starting time point t1 of the shuttle action. Next, the deceleration force output ratio determination unit 92 increases the deceleration force output ratio from zero up to the reference deceleration force output ratio Rde_target during a second time period dt2 which is longer than the first time period dt1, and finishes increasing the speed when the deceleration force output ratio reaches the reference deceleration force output ratio Rde_target.

As a result, when a torque for accelerating the vehicle is generated in the output shaft 63 of the power transmission device 24 at the starting time point t1 of the shuttle action, the target output shaft torque determination unit 82 determines a target output shaft torque so that the torque of the output shaft 63 of the power transmission device 24 is reduced to zero in the first time period dt1. Next, the target output shaft torque determination unit 82 gradually increases the deceleration force from zero to approach a reference deceleration force corresponding to the reference deceleration force output ratio Rde_target in the second time period dt2.

As illustrated in FIG. 8, when the initial deceleration force output ratio Rde0 is equal to zero or greater at the starting time point t1 of the shuttle action, the deceleration force output ratio determination unit 92 increases the deceleration force output ratio from the initial deceleration force output ratio Rde0 to approach the reference deceleration force output ratio Rde_target in a curved manner. As a result, when the deceleration force for decelerating the vehicle is generated in the output shaft 63 of the power transmission device 24 at the starting time point t1 of the shuttle action, the target output shaft torque determination unit 82 gradually increases the deceleration force from the deceleration force at the starting time point t1 of the shuttle action to the reference deceleration force, and finishes increasing the speed at the point where the deceleration force output ratio reaches the reference deceleration force output ratio Rde_target.

When the accelerator operating amount is changed during deceleration, the reference deceleration force output ratio Rde_target is changed in response to the accelerator operating amount after the change. Moreover, when the brake operating amount is changed during deceleration, the reference deceleration force output ratio Rde_target is changed in response to the brake operating amount after the change. The target output shaft torque determination unit 82 gradually changes the deceleration force approaching the reference deceleration force after the change. At this time, the target output shaft torque determination unit 82 gradually increases the deceleration force approaching the reference deceleration force after the change when the reference deceleration force after the change is larger than the current deceleration force. Conversely, the target output shaft torque determination unit 82 gradually decreases the deceleration force approaching the reference deceleration force after the change when the reference deceleration force after the change is smaller than the current deceleration force.

Next, the target deceleration force determination unit 93 illustrated in FIG. 6 calculates a target deceleration force by multiplying the maximum output shaft torque by the deceleration force output ratio. The maximum output shaft torque is determined in response to a speed range selected with the speed change operating member 53*a*. FIG. 10 is a table illustrating relationships between speed ranges and the maximum output shaft torques. T1 and T2 in FIG. 10 represent values of the maximum output shaft torque where T1≥T2≥T3≥T4 with the deceleration force set as positive values. As illustrated in FIG. 10, the maximum output shaft torque decreases as the speed range becomes higher.

When the speed range is in the first speed or the second speed, the target deceleration force determination unit 93 calculates the target deceleration force by multiplying the maximum output shaft torque T1 by the deceleration force output ratio determined by the deceleration force output ratio determination unit 92. When the speed range is in the third speed or the fourth speed, the target deceleration force determination unit 93 calculates the target deceleration force by multiplying the maximum output shaft torque T2 by the deceleration force output ratio determined by the deceleration force output ratio determination unit 92. The target deceleration force corresponds to the above mentioned target output shaft torque To_ref. Because the values of the target deceleration force in the present exemplary embodiment are positive when a deceleration force is generated, specifically values in which the positive values or negative values of the target deceleration force are inverted become the above mentioned target output shaft torque To_ref.

The target deceleration force determination unit 93 calculates a target deceleration power from the target deceleration force and determines the target deceleration force so that the target deceleration power does not exceed the maximum deceleration power illustrated in FIG. 11. The maximum deceleration power is an upper limit of the target deceleration power. The target deceleration power is a horsepower regenerated by the deceleration force and is calculated by multiplying the target deceleration force by an output rotation speed.

Specifically, when the value of the deceleration power calculated from the deceleration force obtained by multiplying the maximum output shaft torque by the deceleration force output ratio, is equal to or less than the maximum deceleration power, the target deceleration force determination unit 93 determines the deceleration force at that time as the target deceleration force. Conversely, when the value of the deceleration power calculated from the deceleration force obtained by multiplying the maximum output shaft torque by the deceleration force output ratio, is greater than the maximum deceleration power, the target deceleration force determination unit 93 determines the deceleration force corresponding to the maximum deceleration power as the target deceleration force.

As illustrated in FIG. 11, when the engine rotation speed is smaller than a predetermined value Ne_th, the maximum deceleration power conforms to a predetermined value Pde_max1 relative to a change in the engine rotation speed. When the engine rotation speed is equal to or greater than the predetermined value Ne_th, the maximum deceleration power is reduced corresponding to an increase in the engine rotation speed.

Next, a method will be explained for determining a target input shaft torque when the shuttle action evaluating unit 91 determines that the shuttle action has started. As illustrated in FIG. 6, the control unit 27 has a target energy reservoir power determination unit 94.

The target energy reservoir power determination unit 94 determines a target energy reservoir power for charging the capacitor 64. The target energy reservoir power determination unit 94 determines the target energy reservoir power on the basis of the charged capacity of the capacitor 64. The charged capacity of the capacitor 64 is calculated from the voltage Vca of the capacitor 64.

Specifically, when the charged capacity is equal to or less than the target charged capacity, the target energy reservoir power determination unit 94 determines the larger of the "target deceleration power" and "a value derived by multiplying a difference between the target charged capacity and the charged capacity of the capacitor by a predetermined gain", as the target energy reservoir power. The shuttle action is a phase when the kinetic energy of the vehicle body is greatly reduced and energy for accelerating the vehicle body in the travel direction for the subsequent acceleration is consumed. Therefore, as much kinetic energy as possible is regenerated during deceleration and stored, and then the stored energy is desirably used in the subsequent acceleration. However, if the charged capacity is equal to or less than the target charged capacity, the charged capacity is likely insufficient for the shuttle action. Therefore, by determining the target energy reservoir power as described above, a value equal to or greater than the target deceleration power that is the maximum value that can be regenerated can be determined as the target energy reservoir power, and consequently the target charged capacity can be reached quickly.

The target charged capacity is stored in the storage unit 56, and information for illustrating the relationship between the target charged capacity and the vehicle speed is stored in the storage unit 56 for example. In this case, the target energy reservoir power determination unit 94 determines the target charged capacity in response to the vehicle speed.

Conversely, when the current charged capacity is greater than the predetermined target charged capacity, the target energy reservoir power determination unit 94 determines the target deceleration power as the target energy reservoir power. In this way, even if the current charged capacity is greater than the predetermined target charged capacity, it is desirable that charging is carried out positively because the number of phases in which energy can be regenerated efficiently during the shuttle action is small. As a result, the target energy reservoir power is determined so that charging is carried out to a level approaching a full charge while monitoring the charged capacity (voltage) of the capacitor.

During a normal action, the target energy reservoir power determination unit 94 determines the target energy reservoir power so that the target charged capacity corresponds to the vehicle speed. For example, the target energy reservoir power determination unit 94 performs proportional control, that is, the target energy reservoir power determination unit 94 determines the target energy reservoir power by multiplying the difference between the target charged capacity and the capacitor charged capacity by a predetermined gain.

The target input shaft torque determination unit 81 determines the target input shaft torque on the basis of the target energy reservoir power and the deceleration power. As illustrated in FIG. 6, the target input shaft torque determination unit 81 has an engine return power determination unit 95 and a target engine torque determination unit 96.

The engine return power determination unit 95 determines an engine return power by subtracting the target energy reservoir power from the target deceleration power. The target engine torque determination unit 96 determines a target engine torque by dividing an engine return power by the engine rotation speed. The target input shaft torque determination unit 81 determines a value of the input torque to the power transmission device 24 corresponding to the target engine torque as the target input shaft torque Te_ref.

The command torque determination unit 83 uses the torque-balance information to determine torque commands for the motors from the target input shaft torque Te_ref and the target output shaft torque To_ref determined as described above. That is, command torques for the motors are determined in the Lo mode using the first torque-balance information depicted in the above mentioned equation (1) from the target input shaft torque Te_ref and the target output shaft torque To_ref. That is, command torques for the motors are determined in the Hi mode using the second torque-balance information depicted in the above mentioned equation (2) from the target input shaft torque Te_ref and the target output shaft torque To_ref. As a result, the deceleration force corresponding to the target output shaft torque To_ref is generated on the output shaft 63 of the power transmission device 24 during the shuttle action.

FIG. 12 is a timing chart illustrating changes in parameters of the work vehicle 1 during a shuttle action. FIG. 12(A) illustrates the tractive force of the work vehicle 1 and indicates the direction for causing the work vehicle 1 to travel forward as positive. FIG. 12(B) illustrates the vehicle speed. The fact that the vehicle speed is positive in FIG. 12(B) signifies that the work vehicle 1 is traveling forward. When the vehicle speed is a negative value, the work vehicle 1 is traveling in reverse. FIG. 12(C) illustrates the positions (FNR positions) of the FR operating member 54*a*. FIG. 12(D) illustrates the states of connection (ON) and disconnection (OFF) of the F-clutch CF. FIG. 12(E) illustrates the states of connection (ON) and disconnection (OFF) of the R-clutch CR.

As illustrated in FIG. 12, before the time point t1, the FNR position is in the reverse travel position (R) (FIG. 12(C)), the F-clutch CF is disconnected (FIG. 12(D)), and the R-clutch CR is connected (FIG. 12(E)). The tractive force at this time is a negative value (FIG. 12(A)). Therefore, a tractive force in the direction in which the work vehicle 1 is traveling in reverse is generated, and the work vehicle 1 travels in reverse (FIG. 12(B)). Therefore, the work vehicle 1 is in a normal action.

When the FNR position at the time point t1 is switched from the reverse travel position (R) to the forward travel position (F), the FNR position is in the forward travel position (F), but the work vehicle 1 is still traveling in reverse. Therefore, the work vehicle 1 enters the shuttle action. At this time, the connection and disconnection states of the F-clutch CF and the R-clutch CR are maintained in the state before the start of the shuttle action. That is, even if the FNR position is switched from the reverse travel position (R) to the forward travel position (F), the F-clutch CF is disconnected (FIG. 12(D)) and the R-clutch CR is connected (FIG. 12(E)).

When the shuttle action is started at the time point t1, the first motor MG1 and the second motor MG2 are controlled as described above with the control during the shuttle action. As a result, while the work vehicle 1 is traveling in reverse (FIG. 12(B)), a tractive force in the direction for causing the work vehicle 1 to travel forward is generated (FIG. 12(A)). That is, a deceleration force for decelerating the work vehicle 1 traveling in reverse is generated. The deceleration force is then increased from the initial deceleration force Tde0 and reaches the reference deceleration force Tde_target at the time point t2 (FIG. 12(A)). Moreover, the vehicle speed in the reverse direction is reduced due to the increase in the deceleration force (FIG. 12(B)).

Because the initial deceleration force Tde0 is negative, the deceleration force in FIG. 12 changes in response to a change in the deceleration force output ratio when the initial deceleration force output ratio Rde0 illustrated in FIG. 7 is a negative value. As a result, the deceleration force during the period from the time point t1 to a time point t1' quickly increases in a linear manner, and the deceleration force during the period from the time point t1' to the time point t2 increases smoothly in a curved manner. When the initial deceleration force Tde0 is equal to or greater than zero, the deceleration force changes in response to a change in the deceleration force output ratio when the initial deceleration force output ratio Rde0 illustrated in FIG. 8 is equal to or greater than zero.

The deceleration force is maintained at the reference deceleration force Tde_target from the time point t2. As a result, the vehicle speed in reverse further decreases and the vehicle speed reaches zero at the time point t3. At this time, the F-clutch CF is switched from the disconnection state to the connection state (FIG. 12(D)). The R-clutch CR is switched from the connection state to the disconnection state (FIG. 12(E)).

The vehicle speed in the forward direction increases from the time point t3 due to the tractive force for causing the work vehicle to travel forward (FIG. 12(A)). At this time, the FNR position is the forward travel position (F) (FIG. 12(C)) and the work vehicle 1 travels forward (FIG. 12(A)). Therefore, the shuttle action is finished at the time point t3 and the action of the work vehicle 1 enters the normal action from the time point t3.

The time point for switching the F-clutch CF and the R-clutch CR is not limited to being synchronized with the time point (t3) when the shuttle action is finished. The switching time point of the F-clutch CF may be before the time point (t3) when the shuttle action is finished. The switching time point of the R-clutch CR may be after the time point (t3) when the shuttle action is finished.

The work vehicle 1 according to the present exemplary embodiment has the following features.

A deceleration force of the output shaft 63 of the power transmission device 24 can be achieved by determining command torques to the motors MG1 and MG2 from the balance of the torques of the power transmission device 24. As a result, the shuttle action in a work vehicle 1 provided with an EMT can be realized.

The target output shaft torque determination unit 82 gradually increases the deceleration force output ratio during the shuttle action. As a result, the work vehicle 1 can be allowed to decelerate smoothly because the deceleration force increases gradually during the shuttle action.

The deceleration force output ratio is determined on the basis of the accelerator operating amount and the brake operating amount. As a result, the deceleration force changes in response to the accelerator operating amount and the brake operating amount. Consequently, operability can be improved because a deceleration force that takes into account the operating desire of the operator can be generated.

The target output shaft torque determination unit 82 increases the deceleration force in a linear manner to zero when the deceleration force is negative, that is, when an acceleration force is generated, at the starting time point of the shuttle action, and then after the deceleration force reaches zero, the deceleration force is increased in a curved manner toward the reference deceleration force. As a result, the deceleration force can be increased in a short time while suppressing swaying of the vehicle body when a shuttle operation is performed during normal travel for example.

The deceleration force is increased in a curved manner from the deceleration force at the starting time point of the shuttle action toward the reference deceleration force when the deceleration force is zero or greater at the starting time point of the shuttle action. As a result, when for example the operator performs a shuttle operation during a light deceleration such as when the acceleration operation is turned off, the work vehicle 1 can be decelerated smoothly.

The target output shaft torque determination unit 82 determines the target output shaft torque so that maximum deceleration power is reduced in response to an increase in the engine rotation speed when the engine rotation speed meets or exceeds a predetermined value. For example, when the capacitor 64 is near a fully charged state, all of the deceleration power is regenerated for the engine 21 and the engine rotation speed is increased. In this case, the deceleration power is suppressed whereby an excessive increase in the engine rotation speed can be suppressed.

The target input shaft torque determination unit 81 determines the target input shaft torque on the basis of the target energy reservoir power and the deceleration power. Therefore, the target input shaft torque can be determined by taking into account the regenerated deceleration power and the target energy reservoir power, a desired deceleration force can be ensured and a desired energy reservoir amount can be ensured and consequently fuel consumption can be improved.

Figure 13:
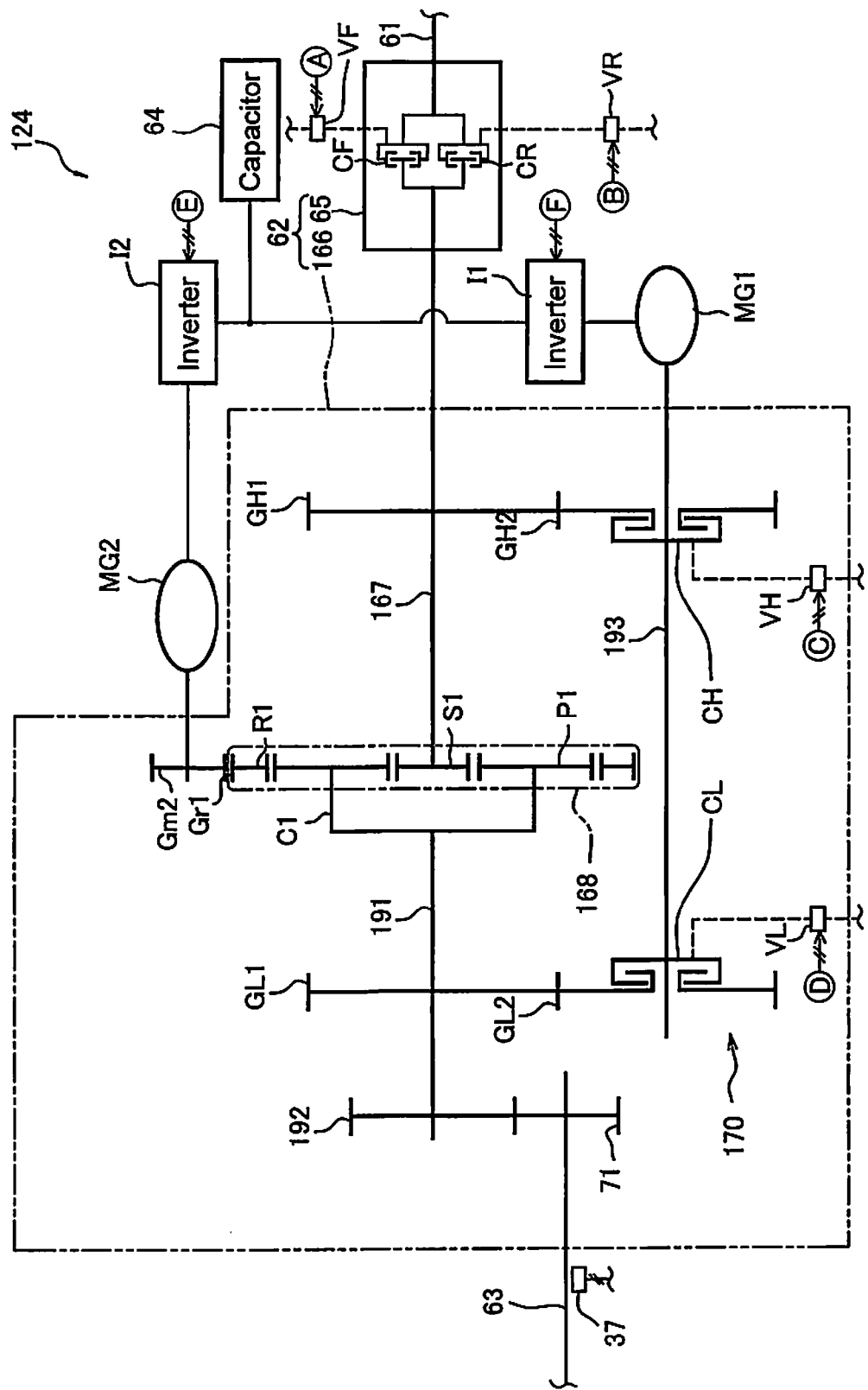
FIG. 13 is a schematic view of a configuration of a power transmission device according to another exemplary embodiment.

The above mentioned power transmission device 24 of the present exemplary embodiment has the first planetary gear mechanism 68 and the second planetary gear mechanism 69. However, the number of the planetary gear mechanisms provided in the power transmission device 24 is not limited to two. The power transmission device 24 may only have one planetary gear mechanism. Alternatively, the power transmission device 24 may have three or more planetary gear mechanisms. FIG. 13 is a schematic view of a configuration of a power transmission device 124 provided in a work vehicle according to a second embodiment. Other configurations of the work vehicle according to the second exemplary embodiment are the same as those of the work vehicle 1 according to the above exemplary embodiment and thus explanations thereof are omitted. The same reference numerals are provided in FIG. 13 for the configurations which are the same as the power transmission device 24 according to the above exemplary embodiment.

As illustrated in FIG. 13, the power transmission device 124 has a speed change mechanism 166. The speed change mechanism 166 has a planetary gear mechanism 168, a first transmission shaft 167, a second transmission shaft 191, and a second transmission shaft gear 192. The first transmission shaft 167 is coupled to the FR switch mechanism 65. The planetary gear mechanism 168 and the second transmission shaft gear 192 are disposed on the same shaft as the first transmission shaft 167 and the second transmission shaft 191.

The planetary gear mechanism 168 has the sun gear S1, the plurality of planet gears P1, the carrier C1 that supports the plurality of planet gears P1, and the ring gear R1. The sun gear S1 is coupled to the first transmission shaft 167. The plurality of planet gears P1 mesh with the sun gear S1 and are supported in a rotatable manner by the carrier C1. The carrier C1 is fixed to the second transmission shaft 191. The ring gear R1 meshes with the plurality of planet gears P1 and is able to rotate. The ring outer periphery gear Gr1 is provided on the outer periphery of the ring gear R1. The second motor gear Gm2 is fixed to the output shaft 63 of the second motor MG2 and the second motor gear Gm2 meshes with the ring outer periphery gear Gr1.

The second transmission shaft gear 192 is coupled to the second transmission shaft 191. The second transmission shaft gear 192 meshes with the output gear 71, and the rotation of the second transmission shaft 192 is outputted to the output shaft 63 via the output gear 71.

The speed change mechanism 166 has a first high-speed gear (referred to below as "first H-gear GH1"), a second high-speed gear (referred to below as "second H-gear GH2"), a first low-speed gear (referred to below as "first L-gear GL1"), a second low-speed gear (referred to below as "second L-gear GL2"), a third transmission shaft 193, and a Hi/Lo switch mechanism 170.

The first H-gear GH1 and the first L-gear GL1 are disposed on the same shaft as the first transmission shaft 167 and the second transmission shaft 191. The first H-gear GH1 is coupled to the first transmission shaft 167. The first L-gear GL1 is coupled to the second transmission shaft 191. The second H-gear GH2 meshes with the first H-gear GH1. The second L-gear GL2 meshes with the first L-gear GL1. The second H-gear GH2 and the second L-gear GL2 are disposed on the same shaft as the third transmission shaft 193, and are disposed to be able to rotate in relation to the third transmission shaft 193. The third transmission shaft 193 is coupled to the output shaft 63 of the first motor MG1.

The Hi/Lo switch mechanism 170 is a mechanism for switching the drive-power transmission path of the power transmission device 24 between a high-speed mode (Hi mode) in which the vehicle speed is high and a low-speed mode (Lo mode) in which the vehicle speed is low. The Hi/Lo switch mechanism 170 has the H-clutch CH that is ON during the Hi mode and the L-clutch CL that is ON during the Lo mode. The H-clutch CH connects and disconnects the second H-gear GH2 and the third transmission shaft 193. The L-clutch CL connects and disconnects the second L-gear GL2 and the third transmission shaft 193.

Figure 14:
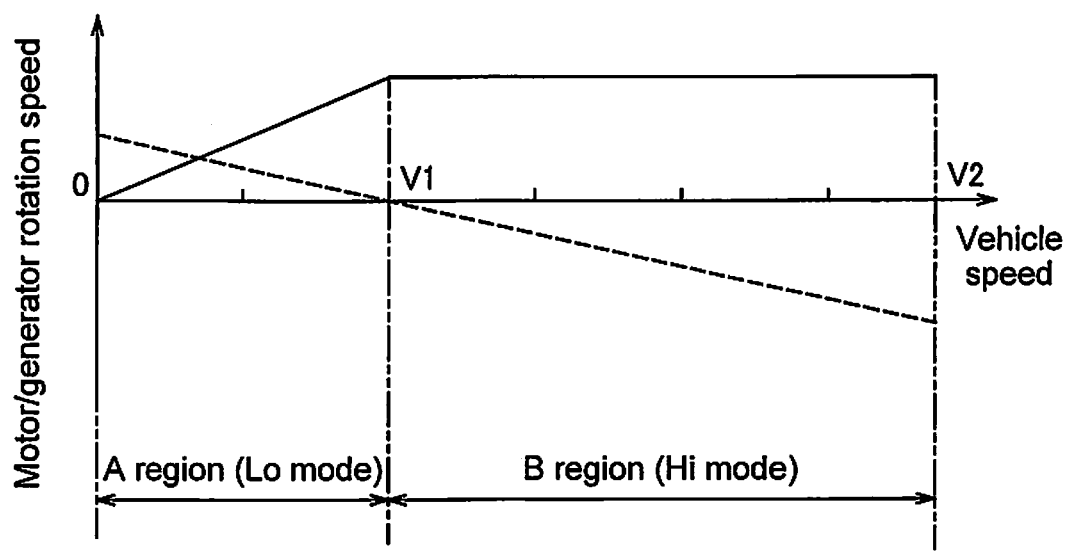
FIG. 14 illustrates changes in the rotation speeds of the first motor and the second motor with respect to the vehicle speed in the power transmission device according to another exemplary embodiment.

Next the operations of the power transmission device 124 according to the second exemplary embodiment will be explained. FIG. 14 illustrates the rotation speeds of the motors MG1 and MG2 with respect to the vehicle speed of the work vehicle according to the second exemplary embodiment. The solid line in FIG. 14 represents the rotation speed of the first motor MG1, and the dashed line represents the rotation speed of the second motor MG2. In the A region (Lo mode) with a vehicle speed from zero to V1, the L-clutch CL is ON (connected) and the H-clutch CH is OFF (disconnected). Because the H-clutch CH is OFF in the A region, the second H-gear GH2 and the third transmission shaft 193 are disconnected. Because the L-clutch CL is ON, the second L-gear GL2 and the third transmission shaft 193 are connected.

The driving power from the engine 21 in the A region is inputted to the sun gear S1 via the first transmission shaft 167, and the driving power is outputted from the carrier C1 to the second transmission shaft 191. Conversely, the driving power inputted to the sun gear S1 is transmitted from the planet gear P1 to the ring gear R1 and outputted through the ring outer periphery gear Gr1 and the second motor gear Gm2 to the second motor MG2. The second motor MG2 functions mainly as a generator in the A region, and a portion of the electrical power generated by the second motor MG2 is stored in the capacitor 64.

The first motor MG1 functions mainly as an electric motor in the A region. The driving power of the first motor MG1 is outputted to the second transmission shaft 191 along a path from the third transmission shaft 193 to the second L-gear GL2 to the first L-gear GL1. The driving power combined in the second transmission shaft 191 in this way is transmitted through the second transmission shaft gear 192 and the output gear 71 to the output shaft 63.

In the B region (Hi mode) in which the vehicle speed exceeds V1, the H-clutch CH is ON (connected) and the L-clutch CL is OFF (disconnected). Because the H-clutch CH is ON in the B region, the second H-gear GH2 and the third transmission shaft 193 are connected. Because the L-clutch CL is OFF, the second L-gear GL2 and the third transmission shaft 193 are disconnected.

The driving power from the engine 21 in the B region is inputted to the sun gear S1 and the driving power is outputted from the carrier C1 to the second transmission shaft 191. The driving power from the engine 21 is outputted from the first H-gear GH1 through the second H-gear GH2 and the third transmission shaft 193 to the first motor MG1. The first motor MG1 functions mainly as a generator in the B region, and thus a portion of the electrical power generated by the first motor MG1 is stored in the capacitor 64.

The driving power of the second motor MG2 is outputted to the second transmission shaft 191 along a path from the second motor gear Gm2 to the ring outer periphery gear Gr1 to the ring gear R1 to the carrier C1. The driving power combined in the second transmission shaft 191 in this way is transmitted through the second transmission shaft gear 192 and the output gear 71 to the output shaft 63.

The control of the power transmission device 124 in the work vehicle according to the second embodiment is the same as the control of the power transmission device 24 in the above embodiment. However, the structure of the power transmission device 124 is different from that of the power transmission device 24, and the torque-balance information is different from the above information. Specifically, a first torque-balance information in the second exemplary embodiment is represented by the following equation 3.

$Ts1\_Low = Te\_ref * r\_fr$ $Tc1\_Low = Ts1\_Low * (-1) * ((Zr1/Zs1)+1)$ $Tr1\_Low = Ts1\_Low * (Zr1/Zs1)$ $Tcm1\_Low = To\_ref * (-1) * (Zod/Zo) + Tc1\_Low$ $Tm1\_Low = Tcm1\_Low * (-1) * (Zm1\_Low/Zm1d\_Low)$ $Tm2\_Low = Tr1\_Low * (-1) * (Zm2/Zm2d)$   Equation 3

A second torque-balance information in the second embodiment is represented by the following equation 4.

$Tc1\_Hi = To\_ref * (-1) * (Zod/Zo)$ $Tr1\_Hi = Tc1\_Hi * (-1) * (1/(Zs/Zr+1))$ $Ts1\_Hi = Tr1\_Hi * (Zs/Zr)$ $Tsm1\_Hi = Ts1 + Te\_ref * r\_fr$ $Tm1\_Hi = Tsm1\_Hi * (-1) * (Zm1\_Hi/Zm1d\_Hi)$ $Tm2\_Hi = Tr1\_Hi * (-1) * (Zm2/Zm2d)$   Equation 4

The contents of the parameters in each of the types of torque-balance information are depicted in Table 2 below.

TABLE 2

| Te_ref | Target input shaft torque |
|---|---|
| To_ref | Target output shaft torque |
| r_fr | Deceleration ratio for the FR switch mechanism 65 (The FR switch mechanism 65 decelerates the engine rotation speed at 1/r_fr to output. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the planetary gear mechanism 168. |

TABLE 2-continued

| Zr1 | Number of teeth of the ring gear R1 in the planetary gear mechanism 168. |
|---|---|
| Zm1d_Hi | Number of teeth of the first H-gear GH1 |
| Zm1d_Low | Number of teeth of the first L-gear GL1 |
| Zm1_Hi | Number of teeth of the second H-gear GH2 |
| Zm1_Low | Number of teeth of the second L-gear GL2 |
| Zm2 | Number of teeth of the ring outer periphery gear Gr1 |
| Zm2d | Number of teeth of the second motor gear Gm2 |
| Zo | Number of teeth of the second transmission shaft gear 192 |
| Zod | Number of teeth of the output gear 71 |

The present invention is not limited to the above exemplary embodiments and various changes and modifications may be made without departing from the spirit of the invention.

The present invention is not limited to the above mentioned wheel loader and may be applied to another type of work vehicle such as a bulldozer, a tractor, a forklift, or a motor grader.

The present invention may be applicable to another type of speed change device, such as a HMT, without being limited to the EMT. In this case, the first motor MG1 functions as a hydraulic motor and a hydraulic pump. The second motor MG2 functions as a hydraulic motor and a hydraulic pump. The first motor MG1 and the second motor MG2 are variable capacitor pump/motors, and the capacities are controlled by the control unit 27 controlling the tilt angle of the skew plate or the inclined shaft. The capacities of the first motor MG1 and the second motor MG2 are controlled so that the command torques Tm1_ref and Tm2_ref calculated in the same way as in the above exemplary embodiments are outputted.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. The configuration of the power transmission device 124 is not limited to the configuration of the above embodiment. For example, the coupling and disposition of the elements of the planetary gear mechanism 168 are not limited to the coupling and disposition of the above exemplary embodiment.

The control of the power transmission device 24 during the normal action is not limited to the control of the above exemplary embodiments. That is in the present embodiment, the target input shaft torque Te_ref and the target output shaft torque To_ref are determined so that predetermined vehicle speed-tractive force characteristics can be achieved in which the tractive force changes continuously in response to the vehicle speed. However, the target input shaft torque Te_ref and the target output shaft torque To_ref may be set optionally.

The torque-balance information is not limited to the equations for balancing the torque as in the above exemplar embodiments. For example, the torque-balance information may be in the format of a table or a map.

Although the target output shaft torque determination unit 82 in the above exemplary embodiments determines the deceleration force using the deceleration force output ratio, the deceleration force may be determined directly without using the deceleration force output ratio. The states of the changes in the deceleration force output ratio and the deceleration force are not limited to those illustrated in FIGS. 7 and 8. For example, the deceleration force output ratio may change in a linear manner when the deceleration force output ratio is equal to or greater than zero. Alternatively, the deceleration force output ratio and the deceleration force may change in a curved manner when the deceleration force output ratio is negative.

According to exemplary embodiments of the present invention, the shuttle action in a work vehicle provided with a HMT or an EMT can be realized.

What is claimed is:

1. A work vehicle, comprising:
   an engine;
   a hydraulic pump driven by the engine;
   a work implement driven by hydraulic fluid discharged from the hydraulic pump;
   a travel device driven by the engine;
   a power transmission device that transmits driving power from the engine to the travel device;
   a control unit for controlling the power transmission device;
   a travel direction detecting unit for detecting a travel direction of a vehicle;
   a forward/reverse travel operating member for selectively switching between a forward travel position and a reverse travel position, and switching between forward travel and reverse travel of the vehicle; and
   a forward/reverse travel position detecting unit for detecting a position of a forward/reverse travel operating member;
   the power transmission device including
      an input shaft;
      an output shaft;
      a gear mechanism including a planetary gear mechanism to transmit rotation of the input shaft to the output shaft;
      a motor connected to a rotating element of the planetary gear mechanism; and
      a forward/reverse travel switch mechanism including a forward travel clutch and a reverse travel clutch, the forward travel clutch being connected and the reverse travel clutch being disconnected when the vehicle is traveling forward and the forward travel clutch being disconnected and the reverse travel clutch being connected when the vehicle is traveling in reverse;
      the power transmission device configured so that a rotation speed ratio of the output shaft with respect to the input shaft is changed by changing the rotation speed of the motor;
   the control unit including
      a shuttle action evaluating unit for determining that the vehicle is in a shuttle action when a direction corresponding to a position of the forward/reverse travel operating member and a traveling direction of the vehicle differ;
      a target input shaft torque determination unit for determining a target input shaft torque which is a target value of a torque on the input shaft of the power transmission device;
      a target output shaft torque determination unit for determining a target output shaft torque which is a target value of a torque on the output shaft of the power transmission device, so that a deceleration force for decelerating the vehicle is generated on the output shaft of the power transmission device in a state in which the connection and disconnection states of the forward travel clutch and the reverse travel clutch are maintained at a state before the start of the shuttle action when the shuttle action is started;
      a storage unit for storing torque-balance information for defining a relationship between the target input shaft torque and the target output shaft torque so that a balance of the torques in the power transmission device is achieved; and
      a command torque determination unit using the torque-balance information to determine a command torque for the motor from the target input shaft torque and the target output shaft torque.

2. The work vehicle according to claim 1, wherein the target output shaft torque determination unit gradually changes the deceleration force during the shuttle action.

3. The work vehicle according to claim 2, further comprising
   an accelerator operating member;
   an accelerator operation detecting unit for detecting an operating amount of the accelerator operating member;
   a brake operating member; and
   a brake operation detecting unit for detecting an operating amount of the brake operating member;
   the target output shaft torque determination unit determining a predetermined reference deceleration force on the basis of an operating amount of the accelerator operating member and an operating amount of the brake operating member; and
   the target output shaft torque determination unit gradually changing the deceleration force approaching the reference deceleration force during the shuttle action.

4. The work vehicle according to claim 3, wherein when the deceleration force for decelerating the vehicle is generated on the output shaft of the power transmission device at the start of the shuttle action, the target output shaft torque determination unit gradually changes the deceleration force from the deceleration force when the shuttle action starts to the reference deceleration force.

5. The work vehicle according to claim 3, wherein when a torque for accelerating the vehicle is generated on the output shaft of the power transmission device when the shuttle action starts, the target output shaft torque determination unit determines the target output shaft torque so that the torque on the output shaft of the power transmission device changes to zero; and
   the target output shaft torque determination unit gradually changes the deceleration force to the reference deceleration force after the torque on the output shaft of the power transmission device reaches zero.

6. The work vehicle according to claim 5, wherein when a torque for accelerating the vehicle is generated on the output shaft of the power transmission device when the shuttle action starts, the target output shaft torque determination unit determines the target output shaft torque so that the torque on the output shaft of the power transmission device changes to zero during a predetermined first time period; and
   the target output shaft torque determination unit gradually changes the deceleration force approaching the reference deceleration force in a second time period that is longer than the first time period after the first time period has elapsed.

7. The work vehicle according to claim 6, further comprising
   an engine rotation speed detecting unit for detecting an engine rotation speed;
   the target output shaft torque determination unit calculating a deceleration power regenerated by the deceleration force, and when the engine rotation speed is equal to or greater than a predetermined value, determining the target output shaft torque so that the upper limit of the deceleration power is reduced in response to an increase in the engine rotation speed.

8. The work vehicle according to claim 7, further comprising an energy reservoir unit for storing energy generated in the motor;

the control unit further including a target energy reservoir power determination unit for determining a target energy reservoir power for accumulating energy in the energy reservoir unit;

the target output shaft torque determination unit calculating a deceleration power regenerated by the deceleration force; and the target input shaft torque determination unit determining the target input shaft torque on the basis of the target energy reservoir power and the deceleration power.

9. The work vehicle according to claim 1, further comprising an engine rotation speed detecting unit for detecting an engine rotation speed;

the target output shaft torque determination unit calculating a deceleration power regenerated by the deceleration force, and when the engine rotation speed is equal to or greater than a predetermined value, determining the target output shaft torque so that the upper limit of the deceleration power is reduced in response to an increase in the engine rotation speed.

10. The work vehicle according to claim 1, further comprising an energy reservoir unit for storing energy generated in the motor;

the control unit further including a target energy reservoir power determination unit for determining a target energy reservoir power for accumulating energy in the energy reservoir unit;

the target output shaft torque determination unit calculating a deceleration power regenerated by the deceleration force; and the target input shaft torque determination unit determining the target input shaft torque on the basis of the target energy reservoir power and the deceleration power.

11. A control method of a work vehicle provided with a power transmission device, wherein the power transmission device includes
an input shaft;
an output shaft;
a gear mechanism that includes a planetary gear mechanism and that transmits rotation of the input shaft to the output shaft;
a motor connected to a rotating element of the planetary gear mechanism;
a forward/reverse travel switch mechanism includes a forward travel clutch and a reverse travel clutch, the forward travel clutch being connected and the reverse travel clutch being disconnected when the vehicle is traveling forward and the forward travel clutch being disconnected and the reverse travel clutch being connected when the vehicle is traveling in reverse; and
the power transmission device is configured to change the rotation speed ratio of the output shaft with respect to the input shaft by changing the rotation speed of the motor, and the control method comprising:

a step for determining that a vehicle is in a shuttle action when a direction corresponding to a position of a forward/reverse travel operating member differs from a traveling direction of the vehicle;

a step for determining a target input shaft torque that is a target value of a torque on the input shaft of the power transmission device;

a step for determining a target output shaft torque which is a target value of a torque on the output shaft of the power transmission device, so that a deceleration force for decelerating the vehicle is generated on the output shaft of the power transmission device in a state in which the connection and disconnection states of the forward travel clutch and the reverse travel clutch are maintained at a state before the start of the shuttle action when the shuttle action is started; and a step for determining a command torque for the motor from the target input shaft torque and the target output shaft torque by using torque-balance information for defining a relationship between the target input shaft torque and the target output shaft torque so that a balance of the torques in the power transmission device is achieved.

* * * * *